(12) United States Patent
Hirose et al.

(10) Patent No.: US 7,943,254 B2
(45) Date of Patent: May 17, 2011

(54) ANODE AND BATTERY

(75) Inventors: Takakazu Hirose, Fukushima (JP); Masayuki Iwama, Fukushima (JP); Koichi Matsumoto, Fukushima (JP); Isamu Konishiike, Fukushima (JP); Kenichi Kawase, Fukushima (JP)

(73) Assignee: Sony Corportion, Tokyo (JP)

( * ) Notice: Subject to any disclaimer, the term of this patent is extended or adjusted under 35 U.S.C. 154(b) by 1030 days.

(21) Appl. No.: 11/684,871

(22) Filed: Mar. 12, 2007

(65) Prior Publication Data
US 2008/0176132 A1  Jul. 24, 2008

(30) Foreign Application Priority Data
Mar. 20, 2006 (JP) ................ 2006-077074

(51) Int. Cl.
H01M 4/62 (2006.01)
(52) U.S. Cl. .............. 429/218.1; 429/223; 429/221; 429/231.5; 429/163
(58) Field of Classification Search .............. 429/218.1, 429/223, 221, 231.5, 163
See application file for complete search history.

(56) References Cited

U.S. PATENT DOCUMENTS

| 6,051,340 | A  | 4/2000 | Kawakami et al. |
| 6,432,579 | B1 | 8/2002 | Tsuji et al. |
| 2005/0147888 | A1 | 7/2005 | Yamamoto et al. |

FOREIGN PATENT DOCUMENTS

| JP | 08-050922 | 2/1996 |
| JP | 11-135115 | 5/1999 |
| JP | 2948205 | 7/1999 |
| JP | 2002-231224 | 8/2002 |
| JP | 2003-217574 | 7/2003 |
| JP | 2004-103476 | 4/2004 |
| JP | 2004-349162 | 12/2004 |
| JP | 2005-197080 | 7/2005 |
| JP | 2005-235591 | 9/2005 |
| JP | 2006-066165 | 3/2006 |

OTHER PUBLICATIONS

Cho et al. "Effects on Ni film thickness on the structural stability of Si/Ni/Cu film electrodes" Materials Letters (2005), vol. Date 2006, 60 (1), pp. 90-93. This article was available online Aug. 16, 2005.*
Japanese Patent Office Action corresponding to Japanese Serial No. 2006-077074 dated Apr. 27, 2010.

* cited by examiner

Primary Examiner — Laura S Weiner
(74) Attorney, Agent, or Firm — SNR Denton US LLP

(57) ABSTRACT

An anode capable of relaxing the stress concentration and improving the characteristics and a battery using it are provided. The anode includes an anode current collector and an anode active material layer containing silicon (Si) as an element, wherein an anode active material layer has a metal element increasing and decreasing region in which a metal element is contained as an element, and a concentration of the metal element is increased and then decreased in a thickness direction.

23 Claims, 9 Drawing Sheets

ANODE AND BATTERY

CROSS REFERENCES TO RELATED APPLICATIONS

The present invention contains subject matter related to Japanese Patent Application JP 2006-077074 filed in the Japanese Patent Office on Mar. 20, 2006, the entire contents of which being incorporated herein by reference.

BACKGROUND OF THE INVENTION

1. Field of the Invention

The present invention relates to an anode containing silicon (Si) as an element and a battery using the anode.

2. Description of the Related Art

In recent years, as mobile devices have been sophisticated and multi-functionalized, the higher capacity of secondary batteries as a power source for these mobile devices has been demanded. As a secondary battery to meet such a demand, there is a lithium ion secondary battery. However, since graphite is used for the anode in the lithium ion secondary battery in practical use currently, the battery capacity thereof is in a saturated state and thus it is difficult to attain a vastly high capacity thereof. Therefore, it is considered to use silicon or the like for the anode. In recent years, forming an anode active material layer on an anode current collector by vapor-phase deposition method or the like has been reported (for example, refer to Japanese Unexamined Patent Application Publication Nos. 8-50922 and 11-135115, and Japanese Patent Publication No. 2948205). Silicon or the like is largely expanded and shrunk due to charge and discharge. Thus, it has been problematic that the cycle characteristics are lowered due to pulverization. However, by using vapor-phase deposition method or the like, pulverization can be prevented, and the anode current collector and the anode active material layer can be integrated. In the result, electron conductivity in the anode becomes extremely favorable, and high performance both in the capacity and in the cycle life is expected.

However, even in the anode in which the anode current collector and the anode active material layer are integrated, when charge and discharge are repeated, the anode active material layer is intensely expanded and shrunk. In the result, for example, the anode active material layer is dropped, and the cycle characteristics are lowered. Further, the anode current collector is deformed due to the stress of the expansion and shrinkage, and thus the battery is swollen. Therefore, it is considered that by adding a metal element such as iron that is not alloyed with lithium (Li) to the anode active material layer, the expansion and shrinkage of the anode active material layer are relaxed and the characteristics are improved (for example refer to Japanese Unexamined Patent Application Publication Nos. 2003-217574 and 2005-197080).

SUMMARY OF THE INVENTION

However, silicon has the high resistance. Therefore, lithium is easily inserted locally when charged. Therefore, there have been the following disadvantages. That is, the anode current collector is deformed due to stress concentration and thus the battery is swollen, and the cycle characteristics are lowered.

In view of the foregoing, in the invention, it is desirable to provide an anode capable of relaxing the stress and improving the characteristics and a battery using the anode.

According to an embodiment of the invention, there is provided an anode including an anode current collector and an anode active material layer containing silicon as an element, wherein the anode active material layer has a metal element increasing and decreasing region in which a metal element is contained as an element, and a concentration of the metal element is increased and then decreased in a thickness direction.

According to an embodiment of the invention, there is provided a battery including a cathode, an anode, and an electrolyte, wherein the anode has an anode current collector and an anode active material layer containing silicon as an element, and the anode active material layer has a metal element increasing and decreasing region in which a metal element is contained as an element, and a concentration of the metal element is increased and then decreased in a thickness direction.

According to the anode of the embodiment of the invention, the anode active material layer has the metal element increasing and decreasing region in which the concentration of the metal element is increased and then decreased. Thereby, the internal resistance of the anode active material layer can be decreased, an electrode reactant such as lithium can be easily inserted into the anode active material layer, and insertion can be uniformly progressed. Therefore, stress concentration can be relaxed, the anode current collector can be prevented from being deformed, and the shape deformation or the like of the anode active material layer can be prevented. Therefore, according to the battery using the anode of the embodiment of the invention, the battery can be prevented from being swollen, and the battery characteristics such as cycle characteristics can be improved.

In particular, when the anode active material layer has a metal element constant region in which a concentration of the metal element therein is lower than the concentration of the metal element in the metal element increasing and decreasing region and constant in the thickness direction, and the metal element increasing and decreasing region and the metal element constant region exist in the form of layer in the thickness direction of the anode active material layer, or when the anode active material layer has a plurality of the metal element increasing and decreasing regions in the form of layer in the thickness direction, or at least one selected from the group consisting of titanium (Ti), chromium (Cr), iron (Fe), cobalt (Co), nickel (Ni), and zirconium (Zr) is contained as the metal element, higher effects can be obtained.

Further, when the anode active material layer further contains oxygen (O) as an element, or when the anode active material layer has a high oxygen region and a low oxygen region in the form of layer in the thickness direction, the expansion and shrinkage of the anode active material layer can be relaxed, the battery can be further prevented from being swollen, and the cycle characteristics can be more improved.

In addition, when some of the metal element is bonded to oxygen to form an oxide, the electrode reactant becomes easily inserted through the vicinity thereof, and insertion can be more uniformly made.

Other and further objects, features and advantages of the invention will appear more fully from the following description.

DETAILED DESCRIPTION OF THE PREFERRED EMBODIMENTS

Embodiments of the invention will be hereinafter described in detail with reference to the drawings.

First Embodiment

Figure 1:
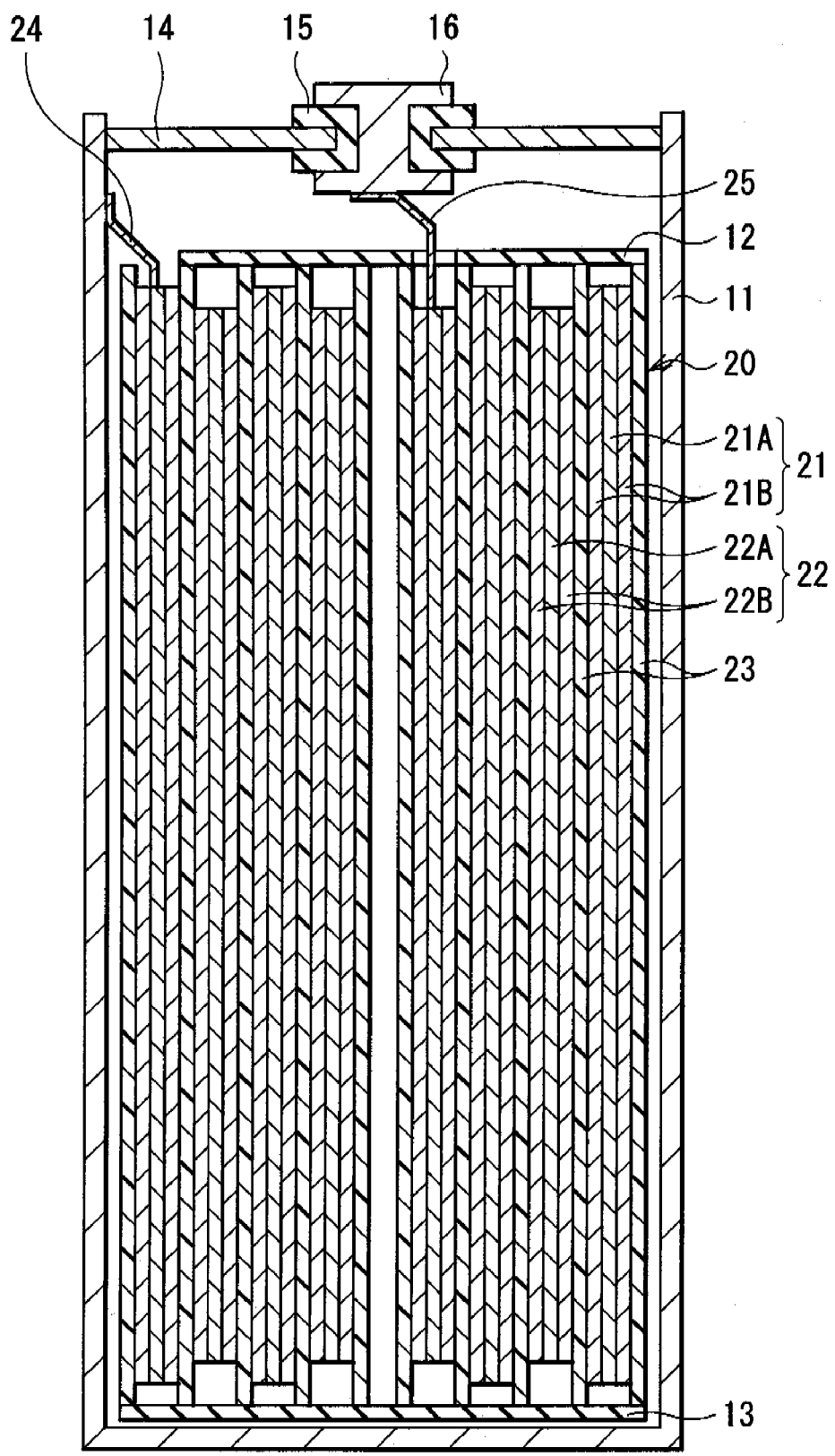
FIG. 1 is a cross section showing a structure of a secondary battery according to a first embodiment of the invention.

FIG. 1 shows a structure of a secondary battery according to a first embodiment of the invention. The secondary battery is a so-called square type battery, and has a battery element 20 inside a battery can 11 in the shape of an approximately hollow cylinder. The battery can 11 is a metal container, and is made of, for example, aluminum (Al), an aluminum alloy, nickel, a nickel alloy, iron, or an iron alloy. The surface of the battery can 11 may be plated, or coated with a resin or the like. Inside the battery can 11, a pair of insulating plates 12 and 13 is arranged so that the battery element 20 is sandwiched between the insulating plates 12 and 13. One end of the battery can 11 is closed, and the other end thereof is opened. The open end of the battery can 11 is sealed with a battery cover 14. A terminal pin 16 is provided for the battery cover 14 with an insulating member 15 in between. The battery cover 14 and the terminal pin 16 are made of, for example, a metal material similar to that of the battery can 11.

The battery element 20 has a structure in which an anode 21 and a cathode 22 are layered with a separator 23 in between and spirally wound several times in the oval shape or the flat shape. An anode lead 24 made of nickel or the like is connected to the anode 21, and a cathode lead 25 made of aluminum or the like is connected to the cathode 22. The anode lead 24 is electrically connected to the battery can 11, and the cathode lead 25 is electrically connected to the terminal pin 16.

The anode 21 has, for example, an anode current collector 21A and an anode active material layer 21B provided on the anode current collector 21A.

The anode current collector 21A is preferably made of a metal material containing at least one metal element not forming an intermetallic compound with lithium. When an intermetallic compound is formed with lithium, the anode is expanded and shrunk due to charge and discharge, structural deformation occurs, and collectivity is lowered. In addition, the ability to support the anode active material layer 21B becomes lowered. In this specification, the metal materials include an alloy including two or more metal elements or an alloy including one or more metal elements and one or more metalloid elements, in addition to simple substances of metal elements. As a metal element not forming an intermetallic compound with lithium, for example, copper (Cu), nickel, titanium, iron, or chromium can be cited.

The anode current collector 21A preferably contains a metal element being alloyed with the anode active material layer 21B. Thereby, the contact characteristics between the anode active material layer 21B and the anode current collector 21A can be improved. As a metal element not forming an intermetallic compound with lithium and being alloyed with the anode active material layer 21B, in the case that the anode active material layer 21B contains silicon as an element as described later, for example, copper, nickel, or iron can be cited. Such an element is preferable in the view of the strength and the conductivity.

The anode current collector 21A may be made of a single layer or a plurality of layers. In the latter case, the layer contacting with the anode active material layer 21B may be made of a metal material being alloyed with silicon, and other layers may be made of other metal material.

The surface of the anode current collector 21A is preferably roughened. The surface roughness Ra thereof is preferably 0.1 μm or more, and more preferably 0.2 μm or more. Thereby, the contact characteristics between the anode active material layer 21B and the anode current collector 21A can be further improved. The surface roughness Ra of the anode current collector 21A is preferably 3.5 μm or less, and more preferably 3.0 μm or less. When the surface roughness Ra is excessively high, there is a possibility that the anode current collector 21A is easily cracked due to expansion of the anode active material layer 21B. The surface roughness Ra means the arithmetic average roughness Ra specified in JIS B0601. It is enough that the surface roughness Ra in at least the region of the anode current collector 21A where the anode active material layer 21B is provided is within the foregoing range.

The anode active material layer 21B contains silicon as an element. Silicon has a high ability to insert and extract lithium, and provides the high energy density. Silicon may be contained in the form of a simple substance, an alloy, or a compound.

Figure 2:
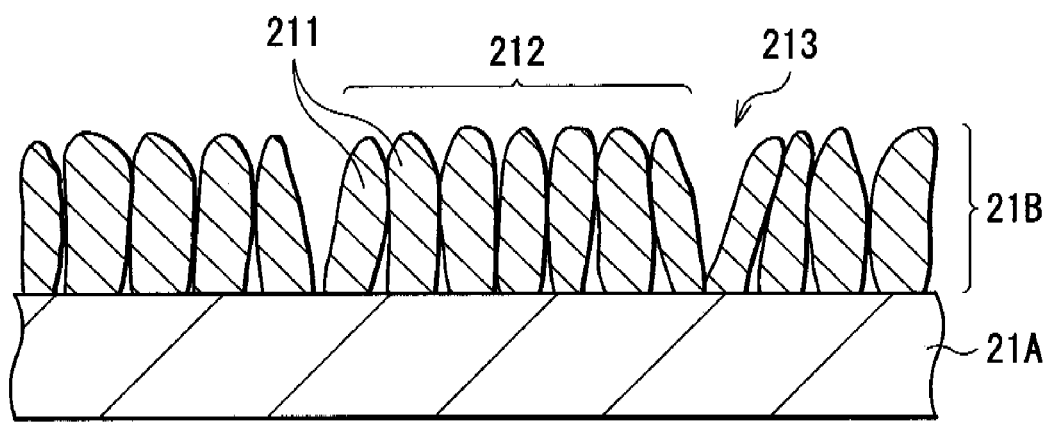
FIG. 2 is a schematic view showing a particle structure of an anode active material layer according to the secondary battery shown in FIG. 1.

At least part of the anode active material layer 21B is preferably formed by, for example, vapor-phase deposition method. FIG. 2 is a schematic view showing a particle structure in a cross section in the thickness direction of the anode active material layer 21B. The anode active material layer 21B is formed, for example, by being grown in the thickness direction, and has a plurality of active material particles 211 containing silicon as an element. The active material particles 211 form a plurality of secondary particles 212 by gathering themselves. In each secondary particle 212, each active material particle 211 is not simply adjacent to each other, but jointed each other at least in part. Each secondary particle 212 is formed by, for example, charge and discharge, and separated by a groove 213. The groove 213 almost reaches the anode current collector 21A.

Further, the active material particle 211 contains a metal element as an element together with silicon. Thereby, expansion of the anode active material layer 21B can be prevented and the internal stress can be relaxed. In addition, the biding characteristics of the active material can be improved, and the shape breakup of the anode active material layer 21B can be prevented. As the metal element, for example, titanium, chromium, iron, cobalt, nickel, or zirconium can be cited. Two or more thereof may be used. Specially, titanium, cobalt, or zirconium is preferable. Cobalt and iron are preferably used together.

The concentration of the metal element is changed in the thickness direction of the anode active material layer 21B. Inside the anode active material layer 21B, there is a metal element increasing and decreasing region in which the concentration of the metal element is once increased and then decreased in the thickness direction. Thereby, the internal resistance of the anode active material layer 21B can be decreased, lithium is easily inserted into the anode active material layer 21B, and insertion can be more uniformly progressed.

Figure 3:
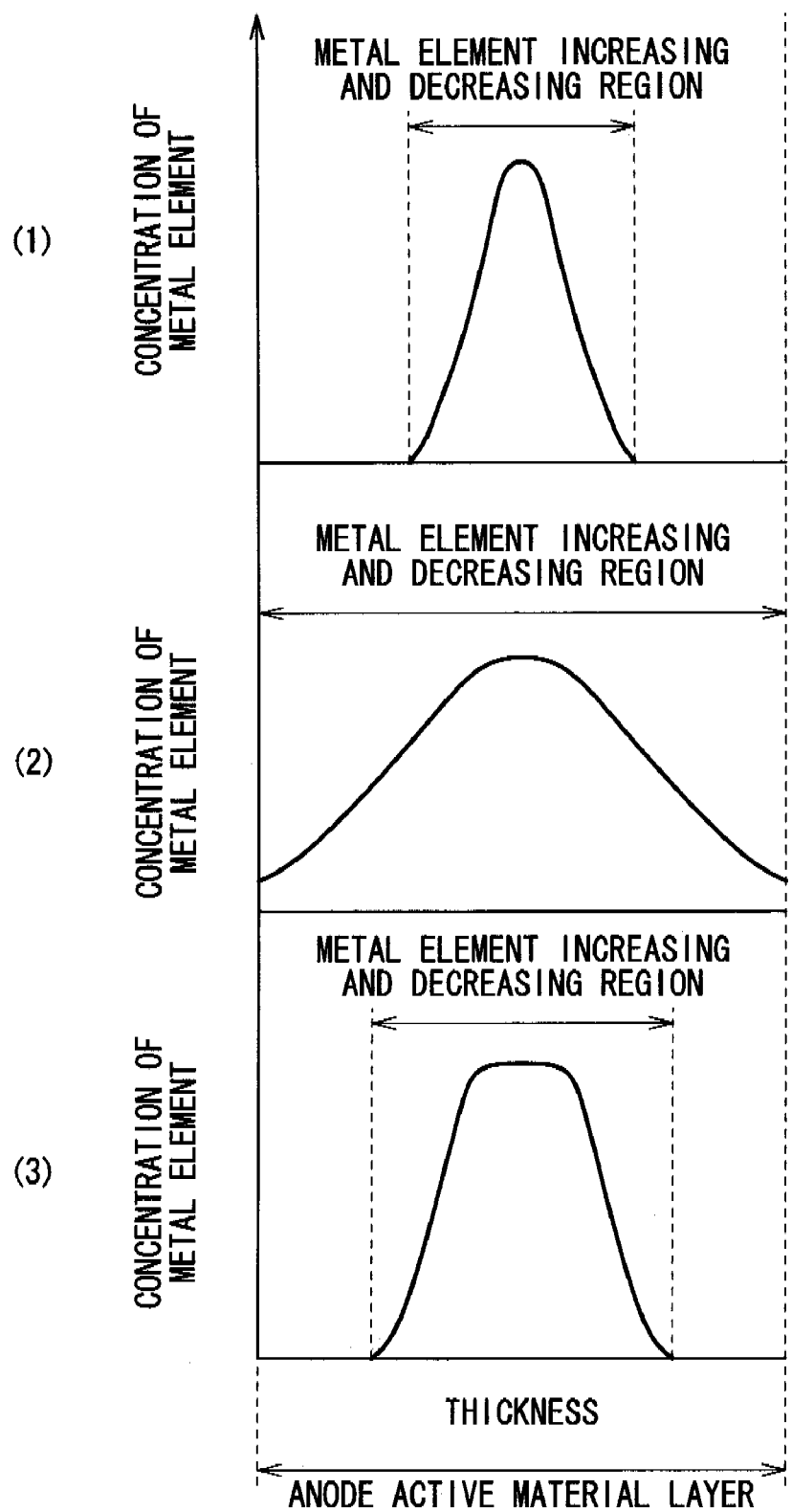
FIG. 3 is a diagram showing a concentration change of a metal element in the thickness direction of the anode active material layer according to the secondary battery shown in FIG. 1.
Figure 4:
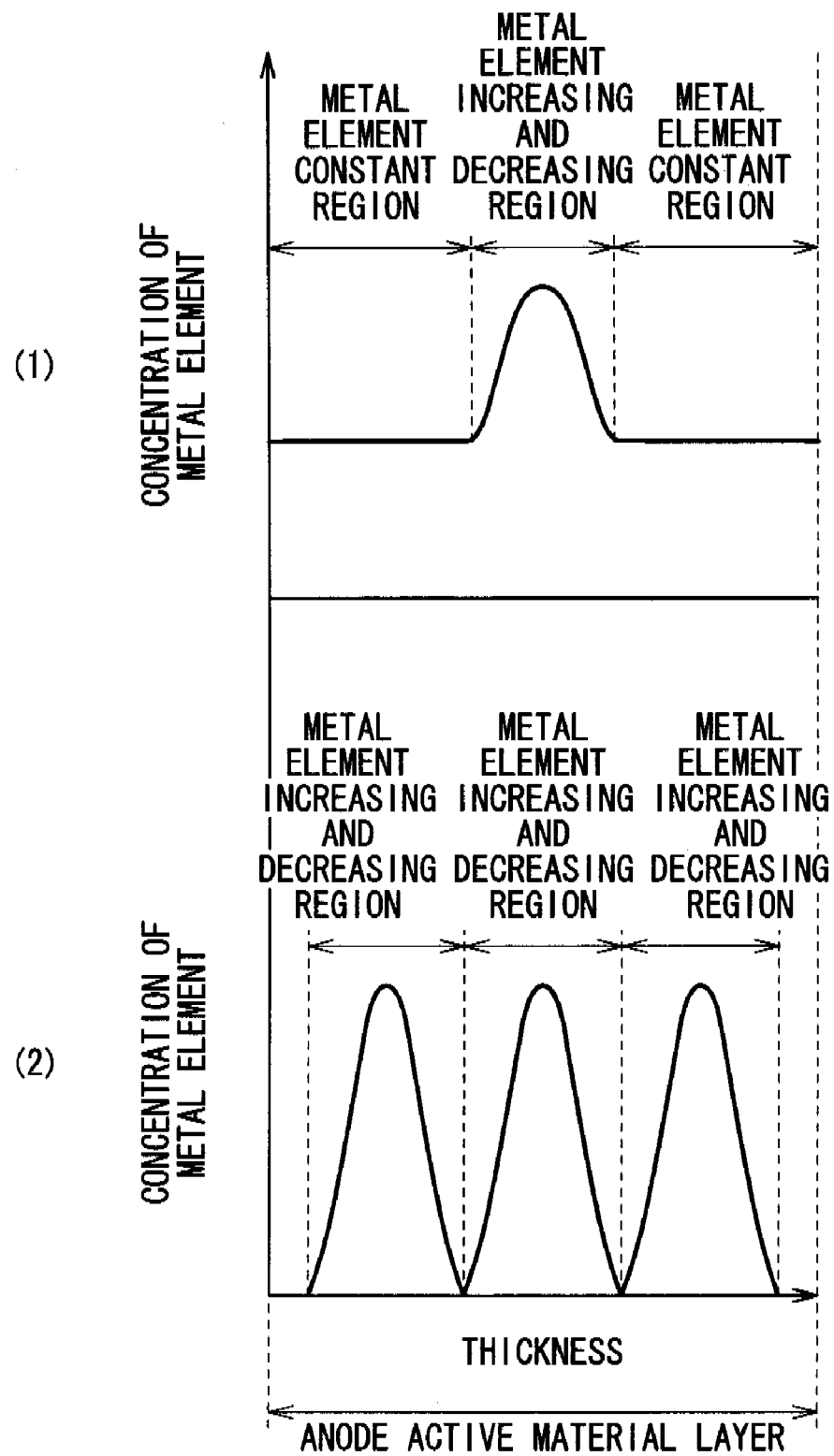
FIG. 4 is other diagram showing a concentration change of the metal element in the thickness direction of the anode active material layer according to the secondary battery shown in FIG. 1.

FIGS. 3 and 4 are schematic views showing concentration change of the metal element in the thickness direction of the anode active material layer 21B. For example, as shown in (1) in FIG. 3, it is possible that the metal element is contained in part of the anode active material layer 21B, and the concentration of the metal element in the thickness direction is once increased and then decreased in the region. Otherwise, as shown in (2) in FIG. 3, it is possible that the metal element is contained in the entire anode active material layer 21B, and the concentration of the metal element in the thickness direction is once increased and then decreased in the entire region, and the entire anode active material layer 21B is the metal element increasing and decreasing region. Otherwise, for example, as shown in (3) in FIG. 3, it is possible that the metal element increasing and decreasing region has a concentration constant region, in addition to the concentration increasing region and the concentration decreasing region of the metal element in the thickness direction. That is, it is possible that the concentration of the metal element in the thickness direction is increased, becomes constant, and then decreased.

Further, as shown in (1) in FIG. 4, it is possible that the anode active material layer 21B has a metal element constant region in which the metal element is contained, and the concentration of the metal element is lower than that in the metal element increasing and decreasing region and is constant in the thickness direction, in addition to the metal element increasing and decreasing region. Such a structure is preferable, since the binding characteristics of the active material can be improved in the entire anode active material layer 21B, the resistance can be decreased, and the internal resistance can be further decreased by the metal element increasing and decreasing region. The words "the concentration of the metal element is constant" mean that the concentration is not intentionally changed, and may include slight change according to the manufacturing.

In addition, as shown in (2) in FIG. 4, the anode active material layer 21B may have a plurality of metal element increasing and decreasing regions. In this case, the respective metal element increasing and decreasing regions may be adjacent to each other, or may be spaced from each other. Further, the concentration of the metal element between the respective metal element increasing and decreasing regions may be 0 or not 0. Such a structure is preferable, since the internal resistance of the anode active material layer 21B can be decreased at a plurality of locations thereof, and lithium is more easily inserted into the anode active material layer 21B.

The metal element increasing and decreasing region is, for example, preferably formed in the form of layer to the anode current collector 21A, in the thickness direction of the anode active material layer 21B. Thereby, the metal element increasing and decreasing region is exposed on the side face of the anode active material particle 211, and thus incoming lithium ions are more easily inserted through a gap between the active material particles 211. The position of the metal element increasing and decreasing region may be anywhere as long as the position is inside the anode active material layer 21B. The concentration gradient of the metal element increasing and decreasing region may be constant or changed on the way. The concentration gradient may be identical or different between in the increasing region and in the decreasing region.

The maximum concentration of the metal element in the thickness direction in the metal element increasing and decreasing region is preferably, for example, in the range from 5 atomic % to 45 atomic %, and more preferably in the range from 10 atomic % to 25 atomic %. Further, the concentration of the metal element in the metal element constant region is preferably in the range from 1 atomic % to 10 atomic %. When the concentration is low, sufficient effects are not able to be obtained. Meanwhile, when the concentration is high, the silicon content becomes low, and the capacity is lowered.

The active material particle 211 preferably further contains oxygen as an element. Thereby, the anode active material layer 21B is further prevented from being expanded. At least part of the oxygen contained in the anode active material layer 21B is preferably bonded to part of silicon. The bonding state may be in a state of silicon oxide, silicon dioxide, or other metastable state. Further, at least part of oxygen is preferably bonded to part of the metal element to compose an oxide. When oxygen exists in the region where the resistance is lowered due to existence of the metal element or in the vicinity thereof, lithium is attracted to oxygen, and lithium is more easily inserted through the vicinity thereof.

The oxygen content in the anode active material layer 21B is preferably in the range from 3 atomic % to 40 atomic %. When the oxygen content is smaller than the foregoing value, sufficient effects are not able to be obtained. When the oxygen content is larger than the foregoing value, the capacity is lowered, the resistance value of the anode active material layer 21B is increased, and thus the anode is swollen by local lithium insertion, and the cycle characteristics are lowered. The anode active material layer 21B does not include a coat formed on the surface of the anode active material layer 21B by decomposition of the electrolytic solution or the like by charge and discharge. Therefore, when the oxygen content in the anode active material layer 21B is calculated, oxygen contained in such a coat is not included in the calculation.

The active material particle 211 preferably has a high oxygen region with the high oxygen concentration and a low oxygen region with the oxygen concentration lower than that of the high oxygen region. The high oxygen region and the low oxygen region are preferably formed in the form of layer to the anode current collector 21A in the thickness direction of the anode active material layer 21B, for example. At least one or more of the high oxygen regions are preferably formed between the low oxygen regions. Thereby, expansion and shrinkage due to charge and discharge can be more effectively prevented. The oxygen concentration in the high oxygen region is preferably 3 atomic % or more. It is preferable that the oxygen concentration in the low oxygen region is small as long as possible, and it is possible that no oxygen is contained, and thus the oxygen concentration is 0. The oxygen concentration is preferably changed incrementally or continuously between the high oxygen region and the low oxygen region. When the oxygen concentration is changed rapidly, the diffusion characteristics of lithium ions are lowered and the resistance is increased in some cases.

It is not necessary that the high oxygen region or the low oxygen region corresponds with the foregoing metal element increasing and decreasing region. However, it is preferable that the high oxygen region and the metal element increasing and decreasing region correspond with each other at least in part. As described above, when oxygen exists in the vicinity of the metal element, higher effects can be obtained.

The anode active material layer 21B is preferably alloyed with the interface with the anode current collector 21A at least in part. Specifically, it is preferable that the element of the anode current collector 21A is diffused in the anode active material layer 21B, or the element of the anode active material layer 21B is diffused in the anode current collector 21A, or the both elements are diffused in each other. Thereby, even when the anode active material layer 21B is expanded and shrunk by charge and discharge, the anode active material layer 21B can be prevented from being dropped from the anode current collector 21A.

The cathode 22 has, for example, a cathode current collector 22A and a cathode active material layer 22B provided on the cathode current collector 22A. Arrangement is made so that the cathode active material layer 22B faces to the anode active material layer 21B. The cathode current collector 22A is made of, for example, aluminum, nickel, or stainless.

The cathode active material layer 22B contains, for example, as a cathode active material, one or more cathode materials capable of inserting and extracting lithium. The cathode active material layer 22B may contain an electrical conductor such as a carbon material and a binder such as polyvinylidene fluoride according to needs. As a cathode material capable of inserting and extracting lithium, for example, a lithium transition metal complex oxide containing lithium and a transition metal is preferably used. Thereby, the high voltage can be generated, and the high energy density can be obtained. As the lithium transition metal complex oxide, for example, an oxide expressed by a general formula, $Li_xMIO_2$ can be cited. In the formula, M preferably includes one or more transition metal elements, and, for example, preferably includes at least one of cobalt and nickel. x varies according to the charge and discharge state of the battery, and is generally in the range of $0.05 \leq x \leq 1.10$. As a specific example of such a lithium transition metal complex oxide, $LiCoO_2$, $LiNiO_2$ or the like can be cited.

The separator 23 separates the anode 21 from the cathode 22, prevents current short circuit due to contact of the both electrodes, and lets through the lithium ions. The separator 23 is made of, for example, polyethylene or polypropylene.

An electrolytic solution as a liquid electrolyte is impregnated in the separator 23. The electrolytic solution contains, for example, a solvent and an electrolyte salt. The electrolytic solution may contain an additive according to needs. As a solvent, for example, a nonaqueous solvent such as ethylene carbonate, propylene carbonate, dimethyl carbonate, diethyl carbonate, ethyl methyl carbonate, 1,3-dioxol-2-one, 4-vinyl-1,3-dioxolane-2-one, and 4-fluoro-1,3-dioxolane-2-one can be cited. One of the solvents may be used singly, or a mixture of two or more solvents may be used. For example, a mixture of a high-boiling point solvent such as ethylene carbonate and propylene carbonate and a low-boiling point solvent such as dimethyl carbonate, diethyl carbonate, and ethyl methyl carbonate is preferably used, since thereby the high ion conductivity can be obtained. Further, a cyclic ester carbonate having an unsaturated bond such as 1,3-dioxol-2-one and 4-vinyl-1,3-dioxolane-2-one, or a carbonic ester derivative having halogen atoms such as 4-fluoro-1,3-dioxolane-2-one is preferably used, since the stability of the electrolytic solution can be improved.

As an electrolyte salt, for example, a lithium salt such as $LiPF_6$, $LiCF_3SO_3$, and $LiClO_4$ can be cited. One of the electrolyte salts may be used singly, or two or more thereof may be used by mixing.

The secondary battery can be fabricated as follows, for example.

First, the anode active material layer 21B containing silicon as an element is formed on the anode current collector 21A by, for example, vapor-phase deposition method. As vapor-phase deposition method, for example, physical deposition method or chemical deposition method can be cited. Specifically, any of vacuum vapor deposition method, sputtering method, ion plating method, laser ablation method, CVD (Chemical Vapor Deposition) method, spraying method and the like may be used. Then, for example, by co-depositing the metal element together with silicon, or by alternately layering a layer containing silicon and a layer containing the metal element, the metal element is added to the anode active material layer 21B. As a raw material, silicon simple substance, a metal element simple substance, an alloy of silicon and a metal element, a silicon oxide, a metal element oxide or the like is used. When oxygen is added to the anode active material layer 21B, for example, oxygen gas may be introduced in the film forming atmosphere.

After the anode active material layer 21B is formed, heat treatment is performed under the vacuum atmosphere or under the non-oxidizing atmosphere if necessary. In some cases, the anode active material layer 21B and the anode current collector 21A are alloyed concurrently when the anode active material layer 21B is formed. However, by performing heat treatment, alloying can be more promoted. In particular, when the layer containing silicon and the layer containing the metal element are alternately layered, the elements in the layers are preferably diffused in each other by performing heat treatment.

Further, the cathode active material layer 22B is formed on the cathode current collector 22A. For example, a cathode active material, and an electrical conductor and a binder if necessary are mixed, the cathode current collector 22A is coated with the resultant mixture, and the resultant is compression-molded to form the cathode. Next, the anode lead 24 is attached to the anode 22, and the cathode lead 25 is attached to the cathode 22. Subsequently, the anode 21 and the cathode 22 are layered with the separator 23 in between and spirally wound several times. After that, the end of the anode lead 24 is welded to the battery can 11, the end of the cathode lead 25 is used as the terminal pin 16, and the spirally-wound anode 21 and cathode 22 is sandwiched between the pair of insulating plates 12 and 13, and the resultant lamination is inserted in the battery can 11. After that, an electrolytic solution is injected into the battery can 11, and impregnated in the separator 23. The open end of the battery can 11 is sealed with the battery cover 14. After the battery is assembled as above, for example, by performing charge and discharge, the groove 213 is formed in the anode active material layer 21B, and the anode active material layer 21B is divided into the secondary particles 212 in which the plurality of active material particles 211 are gathered. Thereby, the secondary battery shown in FIGS. 1 and 2 is obtained.

In the secondary battery, when charged, for example, lithium ions are extracted from the cathode 22 and inserted in the anode 21 through the electrolytic solution. When discharged, for example, lithium ions are extracted from the anode 21 and inserted in the cathode 22 through the electrolytic solution. In this embodiment, the metal element increasing and decreasing region is provided in the anode active material layer 21B, and thus the internal resistance is lowered. Therefore, lithium is easily inserted in the anode active material layer 21B, and insertion is progressed uniformly. Therefore, the stress concentration is relaxed.

As above, according to this embodiment, the metal element increasing and decreasing region is included in the anode active material layer 21B. Therefore, the internal resistance of the anode active material layer 21B can be lowered, lithium can be easily inserted in the anode active material layer 21B, and insertion can be progressed uniformly. Therefore, the stress concentration can be relaxed, and the anode current collector 21A can be prevented from being deformed. In addition, the shape deformation or the like of the anode active material layer 21B can be prevented. Consequently, the battery can be prevented from being swollen, and the battery characteristics such as cycle characteristics can be improved.

In particular, when the anode active material layer 21B further contains the metal element constant region in addition to the metal element increasing and decreasing region, or when the anode active material layer 21B has the plurality of metal element increasing and decreasing regions, or when the anode active material layer 21B contains as a metal element at least one selected from the group consisting of titanium, chromium, iron, cobalt, nickel, and zirconium, higher effects can be obtained.

Further, when the anode active material layer 21B contains oxygen as an element, or when the oxygen content in the anode active material layer 21B is in the range from 3 atomic % to 40 atomic %, or when the anode active material layer 21B has the high oxygen region and the low oxygen region in the form of layer in the thickness direction, the expansion and shrinkage of the anode active material layer can be relaxed, the battery can be further prevented from being swollen, and the cycle characteristics can be more improved.

In addition, when part of the metal element is bonded to oxygen to compose an oxide, lithium can be more easily inserted through the vicinity thereof, and thus insertion can be more uniformly made.

Second Embodiment

Figure 5:
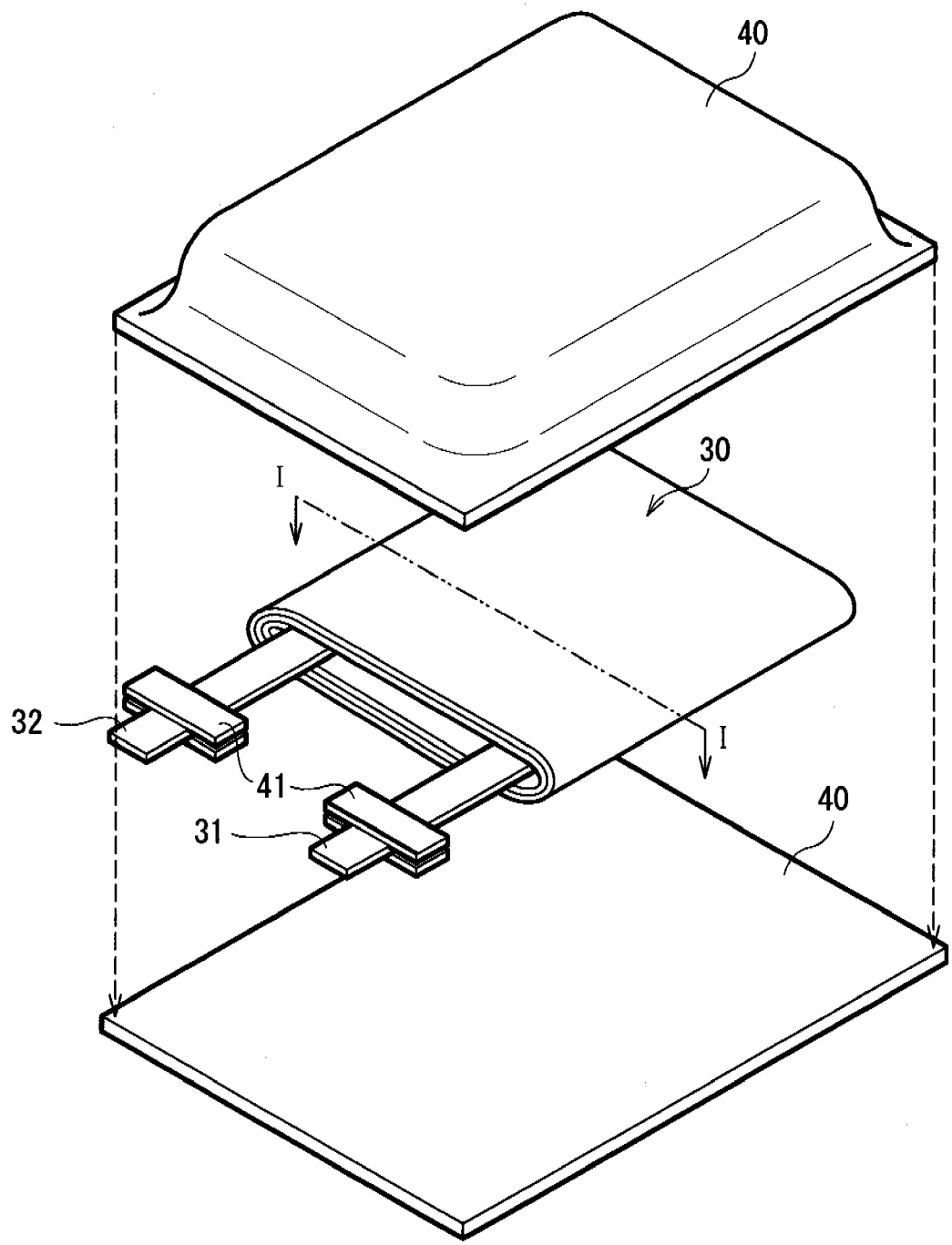
FIG. 5 is an exploded perspective view showing a structure of a secondary battery according to a second embodiment of the invention.

FIG. 5 shows a structure of a secondary battery according to a second embodiment of the invention. In the secondary battery, a battery element 30 on which leads 31 and 32 are attached is contained inside a film package member 40. The leads 31 and 32 are respectively made of, for example, a metal material such as aluminum, copper, nickel, and stainless. The leads 31 and 32 are respectively directed from inside to outside of the package member 40 and derived in the same direction, for example.

The package member 40 is made of a rectangular aluminum laminated film in which, for example, a nylon film, an aluminum foil, and a polyethylene film are bonded together in this order. The package member 40 is, for example, arranged so that the polyethylene film side and the battery element 30 face each other, and the respective outer edges are contacted to each other by fusion bonding or an adhesive. Adhesive films 41 to protect from entering of outside air are inserted between the package member 40 and the leads 31 and 32. The adhesive film 41 is made of a material having contact characteristics to the leads 31 and 32, for example, a polyolefin resin such as polyethylene, polypropylene, modified polyethylene, and modified polypropylene. The package member 40 may be made of a laminated film having other structure, a polymer film such as polypropylene, or a metal film, instead of the foregoing aluminum laminated film.

Figure 6:
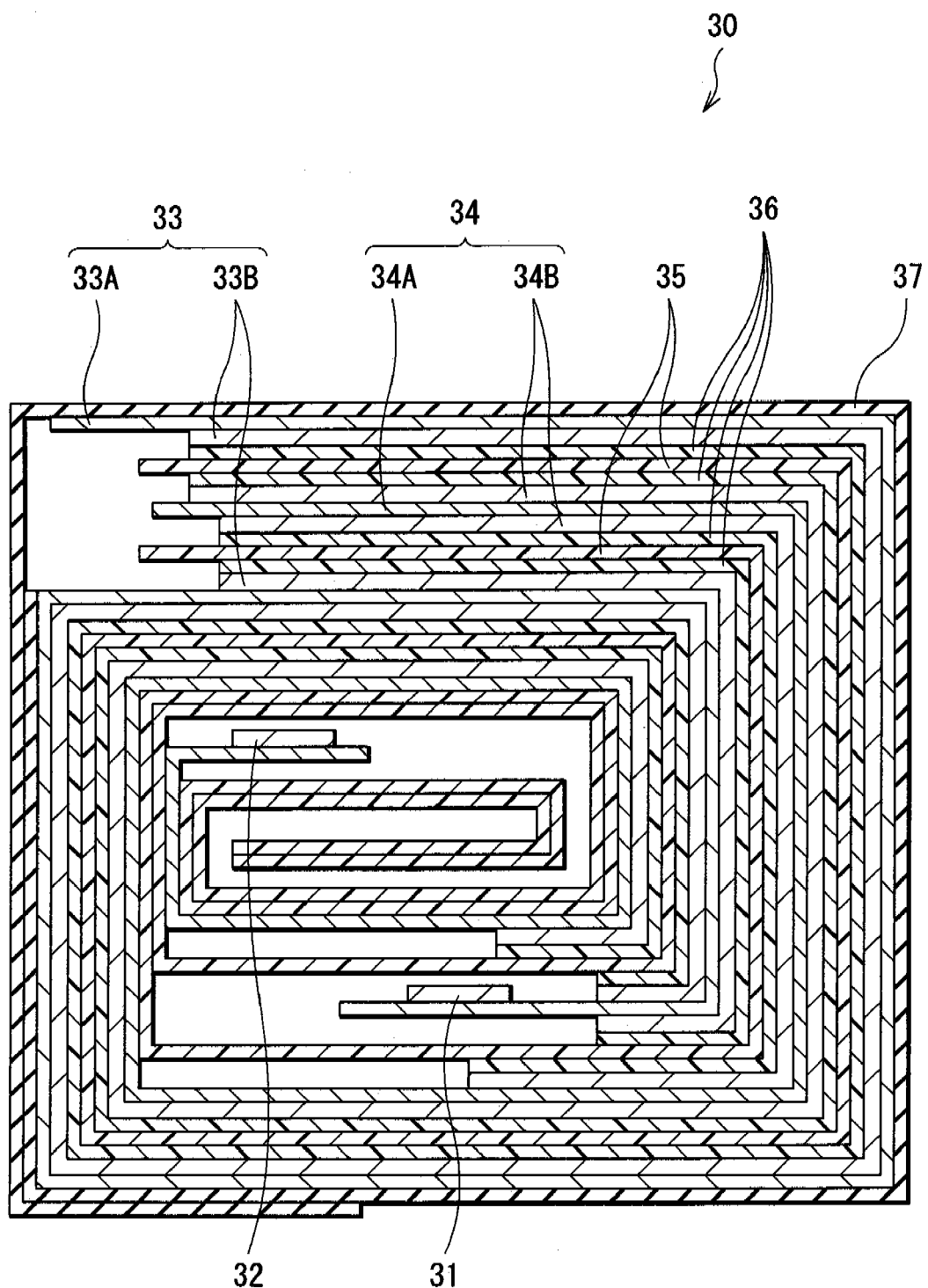
FIG. 6 is a cross section showing a structure taken along line I-I of the secondary battery shown in FIG. 5.

FIG. 6 shows a cross sectional structure taken along line I-I of the battery element 30 shown in FIG. 5. In the battery element 30, an anode 33 and a cathode 34 are layered with a separator 35 and an electrolyte 36 in between, and spirally wound several times in the oval shape or in the flat shape. The outermost periphery thereof is protected by a protective tape 37. The anode 33 has a structure in which an anode active material layer 33B is provided on an anode current collector 33A. The cathode 34 has a structure in which a cathode active material layer 34B is provided on a cathode current collector 34A. The structures of the anode current collector 33A, the anode active material layer 33B, the cathode current collector 34A, the cathode active material layer 34B, and the separator 35 are similar to those of the anode current collector 21A, the anode active material layer 21B, the cathode current collector 22A, the cathode active material layer 22B, and the separator 23 described in the first embodiment. The electrolyte 36 is made of a so-called gelatinous electrolyte in which an electrolytic solution is held by a polymer. The composition of the electrolytic solution is similar to that of the first embodiment. As a polymer material, for example, polyvinylidene fluoride or a copolymer of vinylidene fluoride can be cited. For example, as shown in FIG. 6, the electrolyte 36 may exist in the form of layer between the anode 33, the cathode 34 and the separator 35. Otherwise, the electrolyte 36 may be impregnated in the separator 35. Otherwise, as in the first embodiment, the electrolytic solution may be directly used, instead of being held by the polymer.

The secondary battery can be manufactured, for example, as follows.

First, the anode 33 and the cathode 34 are formed as in the first embodiment. After that, the electrolyte 36 is formed on the anode 33 and the cathode 34. Next, the leads 31 and 32 are attached to the anode 33 and the cathode 34. Subsequently, the anode 33 and the cathode 34 formed with the electrolyte 36 are layered with the separator 35 in between and spirally wound. The protective tape 37 is adhered to the outermost periphery thereof to form the battery element 30. After that, for example, the battery element 30 is sandwiched between the package members 40, and the outer edges of the package members 40 are contacted by thermal fusion bonding or the like to enclose the battery element 30.

Otherwise, the secondary battery may be assembled as follows. First, the anode 33 and the cathode 34 are formed as in the first embodiment. After that, the leads 31 and 32 are attached thereto. Next, the anode 33 and the cathode 34 are layered with the separator 35 in between and spirally wound. The protective tape 37 is adhered to the outermost periphery thereof, and a spirally wound body is formed. Subsequently, the spirally wound body is sandwiched between the package members 40, and the outermost peripheries except for one side are thermally fusion-bonded to obtain a pouched state. After that, an electrolytic composition containing an electrolytic solution, a monomer as a raw material for a polymer, a polymerization initiator, and if necessary other material such as a polymerization inhibitor is injected into the package member 40. After that, the opening of the package member 40 is thermally fusion-bonded and hermetically sealed under the vacuum atmosphere. Then, the resultant is heated to polymerize the monomer to obtain a polymer. Thereby, the gelatinous electrolyte 36 is formed.

After the battery is assembled as above, as in the first embodiment, for example, by performing charge and discharge, the groove 213 and the secondary particle 212 are formed in the anode active material layer 33B.

The secondary battery operates similarly to the secondary battery in the first embodiment, and has effects similar to those of the secondary battery in the first embodiment.

EXAMPLES

Further, specific examples of the invention will be hereinafter described in detail with reference to the drawings.

Examples 1-1 to 1-39

The secondary batteries having the structure shown in FIGS. 5 and 6 were fabricated. First, a silicon layer, an iron layer, and a silicon layer were deposited in this order by vacuum vapor deposition method on the anode current collector 33A made of a copper foil with the surface roughened being 12 μm thick to form the anode active material layer 33B being about 5 μm thick. In each example, the deposition position of the iron layer and the deposition amount of the iron were adjusted, and thereby the maximum concentration position and the maximum concentration of the metal element in the metal element increasing and decreasing region were changed. The deposition position of the iron layer was set at position X/10 from the anode current collector 33A side, where the thickness of the anode active material layer 33B was divided equally into 10 parts. The value X was incremented from 1 to 9. Next, heat treatment was performed in the reduced pressure atmosphere.

Figure 7:
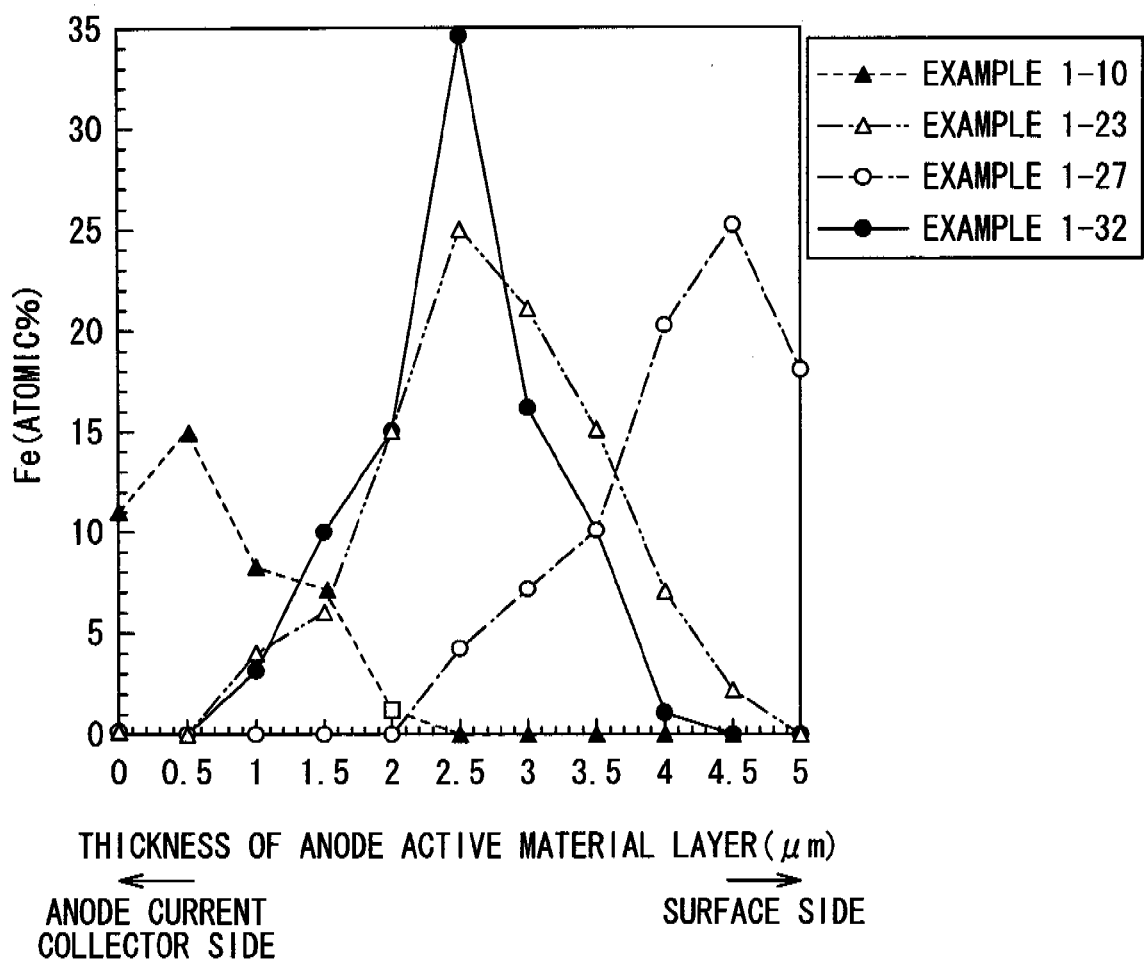
FIG. 7 shows a characteristics diagram showing a concentration change of iron in the thickness direction of an anode active material layer for Examples 1-10, 1-23, 1-27, and 1-32.

For each of the formed anodes 33 of Examples 1-1 to 1-39, a cross section in the thickness direction was cut out by Focused Ion Beam (FIB). After that, the cut-out cross section was observed by SEM. It was confirmed that in all cases, the plurality of active material particles 211 were grown in the thickness direction. Further, the cut-out cross section was provided with local element analysis by Auger Electron Spectroscopy (AES). In the result, it was confirmed that in all cases, the anode active material layer 33B and the anode current collector 33A were alloyed at least in part. Further, the cut-out cross section was provided with line analysis by AES and analysis by Electron Spectroscopy for Chemical Analysis (ESCA) to examine iron concentration change in the thickness direction of the anode active material layer 33B. In the result, it was confirmed that the metal element increasing and decreasing region in which the deposition position of the iron layer was the maximum concentration position was formed. The maximum concentration position X and the maximum concentration of iron are shown in Table 1 and FIG. 7. FIG. 7 shows analysis results by ESCA in Examples 1-10, 1-23, 1-27, and 1-32.

Further, 92 parts by weight of lithium cobaltate (LiCoO$_2$) powder being 5 μm in the average particle diameter as a cathode active material, 3 parts by weight of carbon black as an electrical conductor, and 5 parts by weight of polyvinylidene fluoride as a binder were mixed. The resultant mixture was put in N-methyl-2-pyrrolidone as a disperse medium to obtain slurry. Next, the cathode current collector 34A made of an aluminum foil being 15 μm thick was coated with the slurry, which was dried and pressed to form the cathode active material layer 34B.

Subsequently, 37.5 wt % of ethylene carbonate, 37.5 wt % of propylene carbonate, 10 wt % of vinylene carbonate, and 15 wt % of LiPF$_6$ were mixed to prepare an electrolytic solution. The both faces of the anode 33 and the cathode 34 were respectively coated with a mixture of 30 parts by weight of the electrolytic solution and 10 parts by weight of a copolymer of vinylidene fluoride and hexafluoro propylene to form the electrolyte 36. After that, the leads 31 and 32 were attached, the anode 33 and the cathode 34 were layered with the separator 35 in between and spirally wound, and the resultant body was enclosed in the package member 40 made of an aluminum laminated film. Thereby, the secondary battery was assembled.

As Comparative example 1-1 relative to Examples 1-1 to 1-39, a secondary battery was assembled in the same manner as in Examples 1-1 to 1-39, except that iron was not deposited when the anode active material layer was formed.

For the fabricated secondary batteries of Examples 1-1 to 1-39 and Comparative example 1-1, charge and discharge test was performed at 25 deg C., and the capacity retention ratio at the 31st cycle to the second cycle was obtained. At that time, charge was performed until the battery voltage reached 4.2 V at the constant current density of 1 mA/cm$^2$, and then performed until the current density reached 0.05 mA/cm$^2$ at the constant voltage of 4.2 V. Discharge was performed until the battery voltage reached 2.5 V at the constant current density of 1 mA/cm$^2$. Charge was performed so that the utility ratio of the capacity of the anode 33 became 85% to prevent metal lithium from being precipitated on the anode 33. The capacity retention ratio was calculated as the ratio of the discharge capacity at the 31st cycle to the discharge capacity at the second cycle, that is, as (the discharge capacity at the 31st cycle/the discharge capacity at the second cycle)×100.

Further, for the fabricated secondary batteries of Examples 1-1 to 1-39 and Comparative example 1-1, the thickness of the battery was measured before performing charge and discharge and after performing the 31st charge and discharge. Then, the thickness increasing rate after the 31st cycle was examined. The thickness increasing rate was calculated as the ratio of the thickness increasing amount after the 31st cycle to the thickness before charge and discharge, that is, as [(the thickness after the 31st cycle−the thickness before charge and discharge)/the thickness before charge and discharge]×100. The obtained results are shown in Table 1.

Further, for the secondary batteries of Examples 1-1 to 1-39, the battery was disassembled after the 31st cycle, the anode 33 in a discharged state was taken out, and a cross section in the thickness direction at the central portion of the anode 33 was observed by SEM. It was confirmed that in the all cases, as shown in FIG. 2, the plurality of active material particles 211 gathered to form the secondary particle 212.

TABLE 1

| | Metal element increasing and decreasing region | | | Thickness |
| --- | --- | --- | --- | --- |
| | Metal element | Maximum concentration position X | Maximum concentration (atomic %) | Capacity retention ratio (%) | increasing rate (%) |
| Example 1-1 | Fe | 1 | 5 | 80 | 25 |
| Example 1-2 | | 2 | | 81 | 24 |
| Example 1-3 | | 3 | | 80.2 | 26 |

TABLE 1-continued

| | Metal element increasing and decreasing region | | | Thickness |
| | | Maximum | Maximum | Capacity | increasing |
| | | concentration | concentration | retention ratio | rate |
| | Metal element | position X | (atomic %) | (%) | (%) |
|---|---|---|---|---|---|
| Example 1-4 | | 4 | | 80.5 | 27 |
| Example 1-5 | | 5 | | 80.1 | 29 |
| Example 1-6 | | 6 | | 80.9 | 27 |
| Example 1-7 | | 7 | | 80.6 | 26 |
| Example 1-8 | | 8 | | 80.7 | 24 |
| Example 1-9 | | 9 | | 80.2 | 23 |
| Example 1-10 | | 1 | 15 | 84.2 | 18 |
| Example 1-11 | | 2 | | 84.6 | 17.5 |
| Example 1-12 | | 3 | | 83.4 | 17.6 |
| Example 1-13 | | 4 | | 82.9 | 15 |
| Example 1-14 | | 5 | | 83.4 | 16.5 |
| Example 1-15 | | 6 | | 85.5 | 15.9 |
| Example 1-16 | | 7 | | 84.5 | 16.2 |
| Example 1-17 | | 8 | | 83.6 | 15.4 |
| Example 1-18 | | 9 | | 84.2 | 16.2 |
| Example 1-19 | | 1 | 25 | 89 | 12.8 |
| Example 1-20 | | 2 | | 89.2 | 12.6 |
| Example 1-21 | | 3 | | 89.4 | 12.4 |
| Example 1-22 | | 4 | | 89.6 | 12.8 |
| Example 1-23 | | 5 | | 89.5 | 13.2 |
| Example 1-24 | | 6 | | 89.3 | 12.8 |
| Example 1-25 | | 7 | | 89.5 | 12.4 |
| Example 1-26 | | 8 | | 89.4 | 11.5 |
| Example 1-27 | | 9 | | 89.7 | 12.6 |
| Example 1-28 | | 1 | 35 | 89.5 | 9.7 |
| Example 1-29 | | 2 | | 89.4 | 9.6 |
| Example 1-30 | | 3 | | 89.6 | 9.5 |
| Example 1-31 | | 4 | | 88.9 | 9.8 |
| Example 1-32 | | 5 | | 86.5 | 9.6 |
| Example 1-33 | | 6 | | 85.4 | 9.5 |
| Example 1-34 | | 7 | | 87.4 | 9.2 |
| Example 1-35 | | 8 | | 89.2 | 9.1 |
| Example 1-36 | | 9 | | 88.9 | 8.9 |
| Example 1-37 | | 2 | 45 | 88.8 | 5.6 |
| Example 1-38 | | 5 | | 88.9 | 5.4 |
| Example 1-39 | | 8 | | 88.6 | 5.8 |
| Comparative example 1-1 | | — | — | — | 64 | 55 |

As shown in Table 1, according to Examples 1-1 to 1-39, the capacity retention ratio was improved and the thickness increasing rate was smaller compared to in Comparative example 1-1. That is, it was found that when the metal element increasing and decreasing region was provided inside the anode active material layer 33B, the stress concentration could be relaxed, the battery characteristics such as cycle characteristics could be improved, and the swollenness of the battery could be suppressed.

Further, from the results of Examples 1-1 to 1-39, there was a tendency that as the maximum concentration of the metal element was increased, the thickness increasing rate was decreased, while the capacity retention ratio was once increased and then remained in the same level or was decreased slightly. That is, it was found that the maximum concentration of the metal element in the thickness direction in the metal element increasing and decreasing region was preferably in the range from 5 atomic % to 45 atomic % and more preferably in the range from 10 atomic % to 25 atomic %.

Examples 2-1 to 2-42

Secondary batteries were assembled in the same manner as in Examples 1-1 to 1-39, except that when the anode active material layer 33B was formed, cobalt, nickel, titanium, zirconium, aluminum, chromium, or an iron-cobalt alloy was deposited instead of iron. At that time, the deposition position and the deposition amount of the metal layer were controlled, and thereby the maximum concentration position and the maximum concentration of the metal element in the metal element increasing and decreasing region were changed.

For each of the formed anodes 33 of Examples 2-1 to 2-42, a cross section in the thickness direction was cut out and analyzed in the same manner as in Examples 1-1 to 1-39. In the result, it was confirmed as well that for the anodes 33 of Examples 2-1 to 2-42, the plurality of active material particles 211 were grown in the thickness direction, and the anode active material layer 33B and the anode current collector 33A were alloyed at least in part. Further, it was confirmed that the metal element increasing and decreasing region in which the deposition position of the metal layer was the maximum concentration position was formed. The maximum concentration position X and the maximum concentration of the metal element in the thickness direction of the anode active material layer 33B are shown in Table 2.

For the fabricated secondary batteries of Examples 2-1 to 2-42, charge and discharge were performed in the same manner as in Examples 1-1 to 1-39, and the capacity retention ratio and the thickness increasing rate were examined. The obtained results are shown in Table 2 together with the result of Comparative example 1-1.

TABLE 2

| | Metal element increasing and decreasing region | | | Thickness increasing rate (%) |
|---|---|---|---|---|
| | Metal element | Maximum concentration position X | Maximum concentration (atomic %) | Capacity retention ratio (%) |
| Example 2-1 | Co | 2 | 15 | 85.6 | 16.8 |
| Example 2-2 | | 5 | | 84.9 | 15.8 |
| Example 2-3 | | 8 | | 84.6 | 14.5 |
| Example 2-4 | | 2 | 25 | 90.1 | 11.5 |
| Example 2-5 | | 5 | | 90.2 | 11.2 |
| Example 2-6 | | 8 | | 90.4 | 10.5 |
| Example 2-7 | Ni | 2 | 15 | 86.2 | 16.9 |
| Example 2-8 | | 5 | | 85.2 | 16.2 |
| Example 2-9 | | 8 | | 86.1 | 15.8 |
| Example 2-10 | | 2 | 25 | 89.6 | 12.2 |
| Example 2-11 | | 5 | | 89.7 | 12.5 |
| Example 2-12 | | 8 | | 89.5 | 12.6 |
| Example 2-13 | Ti | 2 | 15 | 87.2 | 17.2 |
| Example 2-14 | | 5 | | 87.9 | 17.6 |
| Example 2-15 | | 8 | | 87.6 | 16.5 |
| Example 2-16 | | 2 | 25 | 91.2 | 13.4 |
| Example 2-17 | | 5 | | 91 | 13.5 |
| Example 2-18 | | 8 | | 91.3 | 13.2 |
| Example 2-19 | Zr | 2 | 15 | 87 | 17.4 |
| Example 2-20 | | 5 | | 86.9 | 17.6 |
| Example 2-21 | | 8 | | 86.7 | 17.5 |
| Example 2-22 | | 2 | 25 | 90.1 | 13.2 |
| Example 2-23 | | 5 | | 90.2 | 12.9 |
| Example 2-24 | | 8 | | 90.1 | 12.8 |
| Example 2-25 | Al | 2 | 15 | 85.3 | 17.1 |
| Example 2-26 | | 5 | | 84.5 | 16.8 |
| Example 2-27 | | 8 | | 84.6 | 16.9 |
| Example 2-28 | | 2 | 25 | 87.5 | 12.9 |
| Example 2-29 | | 5 | | 87.2 | 13.1 |
| Example 2-30 | | 8 | | 87.1 | 12.5 |
| Example 2-31 | Cr | 2 | 15 | 86.9 | 16.5 |
| Example 2-32 | | 5 | | 87.5 | 16.5 |
| Example 2-33 | | 8 | | 87.1 | 16.3 |
| Example 2-34 | | 2 | 25 | 88.9 | 13.2 |
| Example 2-35 | | 5 | | 88.6 | 13.4 |
| Example 2-36 | | 8 | | 89.1 | 12.9 |
| Example 2-37 | Fe + Co | 2 | 15 | 90.2 | 10.6 |
| Example 2-38 | | 5 | | 90.6 | 10.8 |
| Example 2-39 | | 8 | | 90.6 | 10.6 |
| Example 2-40 | | 2 | 25 | 92.1 | 5.6 |
| Example 2-41 | | 5 | | 92.6 | 5.3 |
| Example 2-42 | | 8 | | 92.5 | 5.2 |
| Comparative example 1-1 | — | — | — | 64 | 55 |

As shown in Table 2, according to Examples 2-1 to 2-42, the capacity retention ratio was improved and the thickness increasing rate was smaller compared to in Comparative example 1-1. That is, it was found that even when other metal element was used, similar effects could be obtained. Further, it was found that cobalt, titanium, zirconium, or an iron-cobalt is more preferably used, since thereby higher effects could be obtained.

Examples 3-1 to 3-33

Secondary batteries were assembled in the same manner as in Examples 1-1 to 1-39 or Examples 2-1 to 2-42, except that when the anode active material layer 33B was formed, a co-deposition layer of silicon and a metal element was formed, a metal layer was formed thereon, and a co-deposition layer of silicon and a metal element was formed thereon. As the metal element, iron was used in Examples 3-1 to 3-12, cobalt was used in Examples 3-13 to 3-15, nickel was used in Examples 3-16 to 3-18, titanium was used in Examples 3-19 to 3-21, zirconium was used in Examples 3-22 to 3-24, aluminum was used in Examples 3-25 to 3-27, chromium was used in Examples 3-28 to 3-30, and iron and cobalt were used in Examples 3-31 to 3-33. The content of the metal element in the co-deposition layer was changed in the range from 1 atomic % to 10 atomic % in each example. The deposition position and the deposition amount of the metal layer were controlled so that the maximum concentration position and the maximum concentration of the metal element in the metal element increasing and decreasing region became as shown in Table 3.

Figure 8:
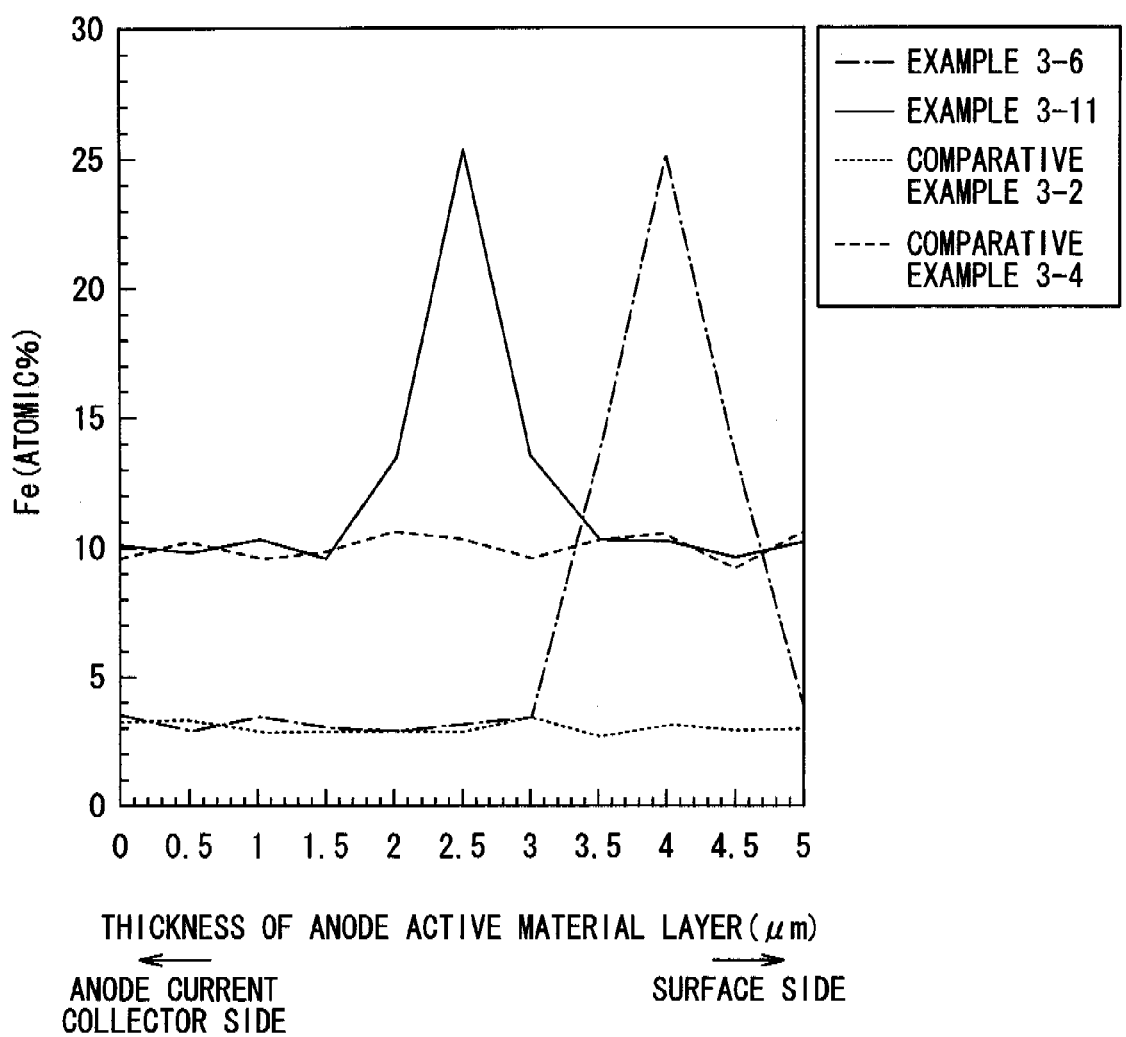
FIG. 8 shows a characteristics diagram showing a concentration change of iron in the thickness direction of an anode active material layer for Examples 3-6, 3-11 and Comparative examples 3-2, 3-4.

For each of the formed anodes 33 of Examples 3-1 to 3-33, a cross section in the thickness direction was cut out and analyzed in the same manner as in Examples 1-1 to 1-39. In the result, it was confirmed that as in Examples 1-1 to 1-39, the plurality of active material particles 211 were formed and the anode active material layer 33B and the anode current collector 33A were alloyed. Further, it was confirmed that the metal element increasing and decreasing region in which the deposition position of the metal layer was the maximum concentration position and the metal element constant region were formed. The maximum concentration position X and the maximum concentration of the metal element in the metal element increasing and decreasing region and the concentration of the metal element in the metal element constant region are shown in Table 3. Further, FIG. 8 shows results obtained by ESCA analysis of concentration change of the metal element in the thickness direction of the anode active material layer 33B for Examples 3-6 and 3-11.

As Comparative examples 3-1 to 3-6 relative to Examples 3-1 to 3-12, secondary batteries were assembled as in Examples 3-1 to 3-12, except that when the anode active material layer was formed, the metal layer was not deposited, and only the co-deposition layer of silicon and iron was formed. The iron concentration in the co-deposition layer was changed in the range from 1 atomic % to 35 atomic % as shown in Table 3. FIG. 8 also shows results obtained by ESCA analysis of concentration change of the metal element in the thickness direction of the anode active material layer 33B for Comparative examples 3-2 and 3-4.

For the fabricated secondary batteries of Examples 3-1 to 3-33 and Comparative examples 3-1 to 3-6, charge and discharge were performed in the same manner as in Examples 1-1 to 1-39, and the capacity retention ratio and the thickness increasing rate were examined. The obtained results are shown in Table 3.

As shown in Table 3, according to Examples 3-1 to 3-12, the capacity retention ratio was improved and the thickness increasing rate was smaller compared to in Comparative examples 3-1 to 3-6. In Examples 3-13 to 3-33, the high characteristics could be obtained similarly. That is, it was found that compared to the case that the metal element was uniformly added to the anode active material layer 33B, higher effects could be obtained in the case that the metal element increasing and decreasing region was provided, even when the metal element content was smaller.

Further, comparing Tables 1 and 2 with Table 3, in Examples 3-1 to 3-33 in which the metal element constant region was provided in addition to the metal element increasing and decreasing region, higher effects could be obtained. That is, it was found that the metal element was more preferably added to the entire anode active material layer 33B.

Examples 4-1 to 4-12

Secondary batteries were assembled in the same manner as in Examples 1-1 to 1-39 or Examples 2-37 to 2-42, except that

TABLE 3

| | Metal element | Concentration in metal element constant region (atomic %) | Metal element increasing and decreasing region | | Capacity retention ratio (%) | Thickness increasing rate (%) |
|---|---|---|---|---|---|---|
| | | | Maximum concentration position X | Maximum concentration (atomic %) | | |
| Example 3-1 | Fe | 1 | 2 | 25 | 90.1 | 11.1 |
| Example 3-2 | | | 5 | | 90.3 | 10.5 |
| Example 3-3 | | | 8 | | 90.5 | 10.6 |
| Example 3-4 | | 3 | 2 | | 91.3 | 9.8 |
| Example 3-5 | | | 5 | | 91.6 | 9.6 |
| Example 3-6 | | | 8 | | 91.5 | 9.7 |
| Example 3-7 | | 5 | 2 | | 92.3 | 8.6 |
| Example 3-8 | | | 5 | | 92.1 | 8.5 |
| Example 3-9 | | | 8 | | 92.6 | 8.9 |
| Example 3-10 | | 10 | 2 | | 93.6 | 8 |
| Example 3-11 | | | 5 | | 93.4 | 7.9 |
| Example 3-12 | | | 8 | | 93.5 | 8.1 |
| Example 3-13 | Co | 1 | 8 | 25 | 91.5 | 9.6 |
| Example 3-14 | | 5 | | | 92.2 | 9 |
| Example 3-15 | | 10 | | | 92.9 | 8.1 |
| Example 3-16 | Ni | 1 | 8 | 25 | 90.6 | 11.5 |
| Example 3-17 | | 5 | | | 91.6 | 10.9 |
| Example 3-18 | | 10 | | | 92.4 | 8.9 |
| Example 3-19 | Ti | 1 | 8 | 25 | 92.1 | 12.8 |
| Example 3-20 | | 5 | | | 93.1 | 11.8 |
| Example 3-21 | | 10 | | | 94.2 | 10 |
| Example 3-22 | Zr | 1 | 8 | 25 | 91.3 | 11.3 |
| Example 3-23 | | 5 | | | 92.5 | 10.9 |
| Example 3-24 | | 10 | | | 93.1 | 8.6 |
| Example 3-25 | Al | 1 | 8 | 25 | 88.9 | 11.2 |
| Example 3-26 | | 5 | | | 89.9 | 10.8 |
| Example 3-27 | | 10 | | | 90.3 | 8.7 |
| Example 3-28 | Cr | 1 | 8 | 25 | 90.3 | 11.6 |
| Example 3-29 | | 5 | | | 91.2 | 10.9 |
| Example 3-30 | | 10 | | | 92.3 | 8.6 |
| Example 3-31 | Fe + Co | 1 | 8 | 25 | 93.5 | 4.9 |
| Example 3-32 | | 5 | | | 94.8 | 4.8 |
| Example 3-33 | | 10 | | | 95.6 | 3.7 |
| Comparative example 3-1 | Fe | 1 | — | — | 80.5 | 31.1 |
| Comparative example 3-2 | | 3 | | | 80.9 | 30.2 |
| Comparative example 3-3 | | 5 | | | 80.5 | 29.8 |
| Comparative example 3-4 | | 10 | | | 84.6 | 16.2 |
| Comparative example 3-5 | | 25 | | | 85.6 | 13.5 |
| Comparative example 3-6 | | 35 | | | 85.2 | 10.9 | when the anode active material layer 33B was formed, the position of the metal layer was changed, and the metal layer was deposited several times. As the metal element, iron was used in Examples 4-1 to 4-6, and iron and cobalt were used in Examples 4-7 to 4-12. The deposition position and the deposition amount of the metal layer were controlled so that the maximum concentration position and the maximum concentration of the metal element in the metal element increasing and decreasing region became as shown in Table 4.

Figure 9:
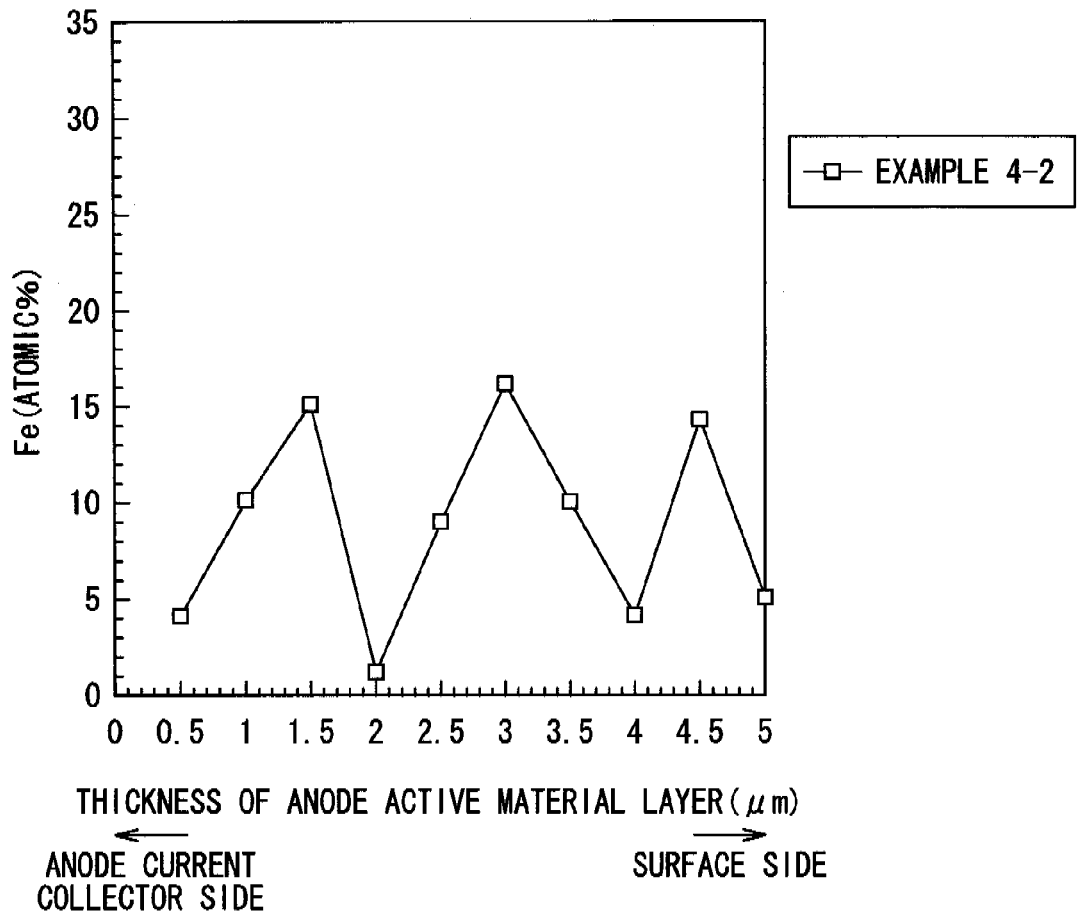
FIG. 9 is a characteristics diagram showing a concentration change of iron in the thickness direction of an anode active material layer for Example 4-2.

For each of the formed anodes 33 of Examples 4-1 to 4-12, a cross section in the thickness direction was cut out and analyzed in the same manner as in Examples 1-1 to 1-39. In the result, it was confirmed that as in Examples 1-1 to 1-39, the plurality of active material particles 211 were formed and the anode active material layer 33B and the anode current collector 33A were alloyed. Further, it was confirmed that a plurality of metal element increasing and decreasing regions in which the deposition position of the metal layer was the maximum concentration position was formed. The maximum concentration position X and the maximum concentration of the metal element in the metal element increasing and decreasing region are shown in Table 4. Further, FIG. 9 shows results obtained by ESCA analysis of concentration change of the metal element in the thickness direction of the anode active material layer 33B for Example 4-2.

For the fabricated secondary batteries of Examples 4-1 to 4-12, charge and discharge were performed in the same manner as in Examples 1-1 to 1-39, and the capacity retention ratio and the thickness increasing rate were examined. The obtained results are shown in Table 4 together with the result of Comparative example 1-1.

of the metal element increasing and decreasing region was large, the characteristics were more improved. That is, it was found that higher effects could be obtained in the case that the plurality of metal element increasing and decreasing regions were provided.

Examples 5-1 to 5-3

Secondary batteries were assembled in the same manner as in Examples 1-1 to 1-39 or Examples 2-1 to 2-42, except that when the anode active material layer 33B was formed, a solid solution raw material of silicon and the metal element was used, the output was changed, and thereby the concentration of the metal element in the thickness direction was changed. As the raw material, a solid solution of silicon and iron was used in Example 5-1, a solid solution of silicon and cobalt was used in Example 5-2, and a solid solution of silicon and chromium was used in Example 5-3. The output was controlled so that the maximum concentration position and the maximum concentration of the metal element became as shown in Table 5.

For each of the formed anodes 33 of Examples 5-1 to 5-3, a cross section in the thickness direction was cut out and analyzed in the same manner as in Examples 1-1 to 1-39. In the result, it was confirmed that as in Examples 1-1 to 1-39, the plurality of active material particles 211 were formed and the anode active material layer 33B and the anode current collector 33A were alloyed. Further, it was confirmed that the metal element was contained in the entire anode active material layer 33B, and the concentration of the metal element was gradually increased up to the maximum concentration posi-

TABLE 4

| | Metal element increasing and decreasing region | | | Capacity retention ratio (%) | Thickness increasing rate (%) |
|---|---|---|---|---|---|
| | Metal element | Number of regions | Maximum concentration position X | Maximum concentration (atomic %) | | |
| Example 4-1 | Fe | 2 | 4, 8 | 15 | 86.5 | 13.2 |
| Example 4-2 | | 3 | 3, 6, 9 | | 88.6 | 10.2 |
| Example 4-3 | | 4 | 2, 4, 6, 8 | | 90.2 | 7.5 |
| Example 4-4 | | 2 | 4, 8 | 25 | 92.1 | 10.3 |
| Example 4-5 | | 3 | 3, 6, 9 | | 93.5 | 7.6 |
| Example 4-6 | | 4 | 2, 4, 6, 8 | | 94.2 | 4.5 |
| Example 4-7 | Fe + Co | 2 | 4, 8 | 15 | 91.3 | 10.1 |
| Example 4-8 | | 3 | 3, 6, 9 | | 91.6 | 9.8 |
| Example 4-9 | | 4 | 2, 4, 6, 8 | | 91.8 | 7 |
| Example 4-10 | | 2 | 4, 8 | 25 | 93.1 | 5.2 |
| Example 4-11 | | 3 | 3, 6, 9 | | 94.5 | 4.9 |
| Example 4-12 | | 4 | 2, 4, 6, 8 | | 94.6 | 4 |
| Comparative example 1-1 | — | — | — | — | 64 | 55 |

As shown in Table 4, according to Examples 4-1 to 4-12, the capacity retention ratio was improved and the thickness increasing rate was smaller compared to in Comparative example 1-1. Compared to Examples 1-10 to 1-27 shown in Table 1 and Examples 2-37 to 2-42 shown in Table 2, higher characteristics could be obtained in Examples 4-1 to 4-12 in which the plurality of metal element increasing and decreasing regions were provided. Further, in particular, in the examples among Examples 4-1 to 4-12 in which the number tion, and then decreased gradually. The maximum concentration position X and the maximum concentration of the metal element are shown in Table 5.

For the fabricated secondary batteries of Examples 5-1 to 5-3, charge and discharge were performed in the same manner as in Examples 1-1 to 1-39, and the capacity retention ratio and the thickness increasing rate were examined. The obtained results are shown in Table 5.

TABLE 5

| | Raw material | Metal element increasing and decreasing region | | | Capacity retention ratio (%) | Thickness increasing rate (%) |
| --- | --- | --- | --- | --- | --- | --- |
| | | Metal element | Maximum concentration position X | Maximum concentration (atomic %) | | |
| Example 5-1 | FeSi solid solution | Fe | 1 | 25 | 89.3 | 13.4 |
| Example 5-2 | CoSi solid solution | Co | 1 | | 88.7 | 14.3 |
| Example 5-3 | CrSi solid solution | Cr | 1 | | 89.2 | 12 |

As shown in Table 5, according to Examples 5-1 to 5-3, the capacity retention ratio was improved and the thickness increasing rate was smaller compared to in Comparative example 1-1 shown in Table 1. That is, it was found that when the metal element was added to the entire anode active material layer 33B, and the concentration of the metal element was gradually increased and then gradually decreased, similar effects could be obtained as well.

Examples 6-1 to 6-14

Secondary batteries were assembled in the same manner as in Examples 1-1 to 1-39 or Examples 2-1 to 2-42, except that when the anode active material layer 33B was formed, oxygen gas was continuously introduced to add oxygen. The introduction amount of the oxygen gas was adjusted so that the oxygen content in the anode active material layer 33B became about 3 atomic % constantly in the thickness direction. As the metal element, iron was used in Examples 6-1 to 6-3, cobalt was used in Examples 6-4 to 6-6, nickel was used in Example 6-7, titanium was used in Example 6-8, zirconium was used in Example 6-9, aluminum was used in Example 6-10, chromium was used in Example 6-11, and iron and cobalt were used in Examples 6-12 to 6-14. The deposition position and the deposition amount of the metal layer were controlled so that the maximum concentration position and the maximum concentration of the metal element in the metal element increasing and decreasing region became as shown in Table 6.

For each of the formed anodes 33 of Examples 6-1 to 6-14, a cross section in the thickness direction was cut out and analyzed in the same manner as in Examples 1-1 to 1-39. In the result, it was confirmed as in Examples 1-1 to 1-39 that the plurality of active material particles 211 were formed and the anode active material layer 33B and the anode current collector 33A were alloyed. Further, it was confirmed that the metal element increasing and decreasing region in which the deposition position of the metal layer was the maximum concentration position was formed, and approximately 3 atomic % oxygen was contained in the entire anode active material layer 33B. Furthermore, it was confirmed that part of the metal element was bonded to oxygen to form an oxide. The maximum concentration position X and the maximum concentration of the metal element in the metal element increasing and decreasing region and the oxygen content are shown in Table 6.

For the fabricated secondary batteries of Examples 6-1 to 6-14, charge and discharge were performed in the same manner as in Examples 1-1 to 1-39, and the capacity retention ratio and the thickness increasing rate were examined. The obtained results are shown in Table 6 together with the results of Examples 1-20 to 1-26, 2-4 to 2-6, 2-11, 2-17, 2-22, 2-29, 2-35, and 2-40 to 2-42.

TABLE 6

| | Metal element increasing and decreasing region | | | | Capacity retention ratio (%) | Thickness increasing rate (%) |
| --- | --- | --- | --- | --- | --- | --- |
| | Metal element | Maximum concentration position X | Maximum concentration (atomic %) | Oxygen content (atomic %) | | |
| Example 1-20 | Fe | 2 | 25 | — | 89.2 | 12.6 |
| Example 1-23 | | 5 | | — | 89.5 | 13.2 |
| Example 1-26 | | 8 | | — | 89.4 | 11.5 |
| Example 6-1 | | 2 | | 3 | 91.2 | 10.6 |
| Example 6-2 | | 5 | | | 92.3 | 10.5 |
| Example 6-3 | | 8 | | | 92.1 | 10.9 |
| Example 2-4 | Co | 2 | 25 | — | 90.1 | 11.5 |
| Example 2-5 | | 5 | | | 90.2 | 11.2 |
| Example 2-6 | | 8 | | | 90.4 | 10.5 |
| Example 6-4 | | 2 | | 3 | 92.6 | 8.9 |
| Example 6-5 | | 5 | | | 93.1 | 8.7 |
| Example 6-6 | | 8 | | | 93.2 | 8.8 |
| Example 2-11 | Ni | 5 | 25 | — | 89.7 | 12.5 |
| Example 6-7 | | | | 3 | 90.1 | 11.8 |
| Example 2-17 | Ti | 5 | 25 | — | 91 | 13.5 |
| Example 6-8 | | | | 3 | 92.1 | 12.2 |
| Example 2-23 | Zr | 5 | 25 | — | 90.2 | 12.9 |
| Example 6-9 | | | | 3 | 91.3 | 11.3 |

TABLE 6-continued

|  | Metal element increasing and decreasing region | | | Capacity retention ratio (%) | Thickness increasing rate (%) |
|---|---|---|---|---|---|
|  | Metal element | Maximum concentration position X | Maximum concentration (atomic %) | Oxygen content (atomic %) | | |

|  | Metal element | Maximum concentration position X | Maximum concentration (atomic %) | Oxygen content (atomic %) | Capacity retention ratio (%) | Thickness increasing rate (%) |
|---|---|---|---|---|---|---|
| Example 2-29 | Al | 5 | 25 | — | 87.2 | 13.1 |
| Example 6-10 | | | | 3 | 89.3 | 11.9 |
| Example 2-35 | Cr | 5 | 25 | — | 88.6 | 13.4 |
| Example 6-11 | | | | 3 | 89.9 | 11.6 |
| Example 2-40 | Fe + Co | 2 | 25 | — | 92.1 | 5.6 |
| Example 2-41 | | 5 | | | 92.6 | 5.3 |
| Example 2-42 | | 8 | | | 92.5 | 5.2 |
| Example 6-12 | | 2 | | 3 | 93.6 | 4.9 |
| Example 6-13 | | 5 | | | 94.3 | 4.8 |
| Example 6-14 | | 8 | | | 94.1 | 4.6 |

As shown in Table 6, according to Examples 6-1 to 6-14, the capacity retention ratio was improved and the thickness increasing rate was smaller compared to in Examples 1-20 to 1-26, 2-4 to 2-6, 2-11, 2-17, 2-22, 2-29, 2-35, and 2-40 to 2-42. That is, it was found that oxygen as an element was preferably contained in the anode active material layer 33B.

Examples 7-1 to 7-6

Secondary batteries were assembled in the same manner as in Examples 1-1 to 1-39, except that when the anode active material layer 33B was formed, oxygen gas was continuously introduced to add oxygen. The introduction amount of the oxygen gas was adjusted so that the oxygen content in the anode active material layer 33B became approximately constant in the thickness direction. The oxygen content was changed from 1 atomic % to 45 atomic % in each example. As the metal element, iron was used. The deposition position and the deposition amount of the iron layer were controlled so that the maximum concentration position X of the metal element in the metal element increasing and decreasing region became 5 and the maximum concentration thereof became 25 atomic %.

For each of the formed anodes 33 of Examples 7-1 to 7-6, a cross section in the thickness direction was cut out and analyzed in the same manner as in Examples 1-1 to 1-39. In the result, it was confirmed as in Examples 1-1 to 1-39 that the plurality of active material particles 211 was formed and the anode active material layer 33B and the anode current collector 33A were alloyed. Further, the metal element increasing and decreasing region in which the deposition position of the metal layer was the maximum concentration position was formed, oxygen was contained in the entire anode active material layer 33B, and the oxygen content was as shown in Table 7.

For the fabricated secondary batteries of Examples 7-1 to 7-6, charge and discharge were performed in the same manner as in Examples 1-1 to 1-39, and the capacity retention ratio and the thickness increasing rate were examined. The obtained results are shown in Table 7 together with the result of Example 6-2.

TABLE 7

|  | Metal element increasing and decreasing region | | | Capacity retention ratio (%) | Thickness increasing rate (%) |
|---|---|---|---|---|---|

|  | Metal element | Maximum concentration position X | Maximum concentration (atomic %) | Oxygen content (atomic %) | Capacity retention ratio (%) | Thickness increasing rate (%) |
|---|---|---|---|---|---|---|
| Example 7-1 | Fe | 5 | 25 | 1 | 89.5 | 10.6 |
| Example 7-2 | | | | 2 | 89.6 | 10.3 |
| Example 6-2 | | | | 3 | 92.3 | 10.5 |
| Example 7-3 | | | | 15 | 93.4 | 9.5 |
| Example 7-4 | | | | 25 | 94.5 | 7.5 |
| Example 7-5 | | | | 40 | 95.2 | 5.2 |
| Example 7-6 | | | | 45 | 94.3 | 5.3 |

As shown in Table 7, when the oxygen content was increased, the capacity retention ratio was improved and the thickness increasing rate was smaller, while when the oxygen content exceeds 40 atomic %, the capacity retention ratio and the thickness increasing rate remained at the same level or were slightly deteriorated. That is, it was found that the oxygen content in the anode active material layer 33B was preferably in the range from 3 atomic % to 40 atomic %.

Examples 8-1 to 8-23

Secondary batteries were assembled in the same manner as in Examples 1-1 to 1-39 or Examples 2-37 to 2-42, except that when the anode active material layer 33B was formed, the position of a metal layer was changed and the metal layer was deposited several times, and oxygen gas was introduced to add oxygen when the metal layer was deposited. As the metal element, iron was used in Examples 8-1 to 8-10, cobalt was used in Examples 8-11 to 8-13, nickel was used in Example 8-14, titanium was used in Example 8-15, zirconium was used in Examples 8-16 to 8-18, aluminum was used in Example 8-19, chromium was used in Example 8-20, and iron and cobalt were used in Examples 8-21 to 8-23. The deposition position and the deposition amount of the metal layer were controlled so that the maximum concentration position and the maximum concentration of the metal element in the metal element increasing and decreasing region became as shown in Table 8. The introduction amount of the oxygen gas was adjusted so that the oxygen concentration in the maximum concentration position X of the metal element became as shown in Table 8.

For each of the formed anodes 33 of Examples 8-1 to 8-23, a cross section in the thickness direction was cut out and analyzed in the same manner as in Examples 1-1 to 1-39. In the result, it was confirmed that as in Examples 1-1 to 1-39, the plurality of active material particles 211 were formed and the anode active material layer 33B and the anode current collector 33A were alloyed. Further, it was confirmed that the plurality of metal element increasing and decreasing regions in which the deposition position of the metal layer was the maximum concentration position was formed, and the high oxygen region was formed in each metal element increasing and decreasing region. Furthermore, it was confirmed that part of the metal element was bonded to oxygen to form an oxide. The maximum concentration position X and the maximum concentration of the metal element in the metal element increasing and decreasing region are shown in Table 8.

For the fabricated secondary batteries of Examples 8-1 to 8-23, charge and discharge were performed in the same manner as in Examples 1-1 to 1-39, and the capacity retention ratio and the thickness increasing rate were examined. The obtained results are shown in Table 8 together with the result of Examples 4-4, 4-5, and 4-11.

TABLE 8

| | Metal element increasing and decreasing region | | | | | |
|---|---|---|---|---|---|---|
| | Metal element | Number of regions | Maximum concentration position X | Maximum concentration (atomic %) | Oxygen concentration in value X (atomic %) | Capacity retention ratio (%) | Thickness increasing rate (%) |
| Example 4-4 | Fe | 2 | 4, 8 | 25 | — | 92.1 | 10.3 |
| Example 8-1 | | | | | 3 | 92.9 | 9.8 |
| Example 4-5 | | 3 | 3, 6, 9 | | — | 93.5 | 7.6 |
| Example 8-2 | | | | | 1 | 93.5 | 7.5 |
| Example 8-3 | | | | | 2 | 93.6 | 7.5 |
| Example 8-4 | | | | | 3 | 93.9 | 7.1 |
| Example 8-5 | | | | | 10 | 94.5 | 6.5 |
| Example 8-6 | | | | | 25 | 95.6 | 6 |
| Example 8-7 | | | | | 35 | 95.6 | 5.6 |
| Example 8-8 | | | | | 40 | 96.1 | 5.1 |
| Example 8-9 | | | | | 45 | 95.9 | 5.2 |
| Example 8-10 | | 4 | 2, 4, 6, 8 | | 3 | 95.9 | 4.1 |
| Example 8-11 | Co | 3 | 3, 6, 9 | 25 | 3 | 94.6 | 6.8 |
| Example 8-12 | | | | | 10 | 95.3 | 5.8 |
| Example 8-13 | | | | | 25 | 96.3 | 5.6 |
| Example 8-14 | Ni | 3 | 3, 6, 9 | 25 | 3 | 93.6 | 6.7 |
| Example 8-15 | Ti | 3 | 3, 6, 9 | 25 | 3 | 93.8 | 6.9 |
| Example 8-16 | Zr | 3 | 3, 6, 9 | 25 | 3 | 93.6 | 6.8 |
| Example 8-17 | | | | | 10 | 94.3 | 5.4 |
| Example 8-18 | | | | | 25 | 95.6 | 5.1 |
| Example 8-19 | Al | 3 | 3, 6, 9 | 25 | 3 | 92.9 | 6.5 |
| Example 8-20 | Cr | 3 | 3, 6, 9 | 25 | 3 | 93.2 | 6.3 |
| Example 4-11 | Fe + Co | 3 | 3, 6, 9 | 25 | — | 94.5 | 4.9 |
| Example 8-21 | | | | | 3 | 96.9 | 2.9 |
| Example 8-22 | | | | | 10 | 97.2 | 2.1 |
| Example 8-23 | | | | | 25 | 97.5 | 1.9 |

As shown in Table 8, according to Examples 8-1 to 8-10 and 8-21 to 8-23, the capacity retention ratio was further improved and the thickness increasing rate was further smaller compared to in Examples 4-4, 4-5, and 4-11. In Examples 8-11 to 8-20, higher characteristics could be obtained similarly. That is, it was fount that the high oxygen region was more preferably formed in the metal element increasing and decreasing region.

Examples 9-1 to 9-4

Secondary batteries were assembled in the same manner as in Example 1-23, except that the surface roughness Ra of the anode current collector 33A was changed in the range from 0.1 μm to 0.4 μm. That is, iron was used as a metal element, and the deposition position and the deposition amount of the iron layer were controlled so that the maximum concentration position X of iron in the metal element increasing and decreasing region was 5 and the maximum concentration thereof became 25 atomic %.

For the fabricated secondary batteries of Examples 9-1 to 9-4, charge and discharge were performed in the same manner as in Example 1-23, and the capacity retention ratio and the thickness increasing rate were examined. The obtained results are shown in Table 9.

TABLE 9

| | Surface roughness Ra of anode current collector (μm) | Metal element increasing and decreasing region | | | Capacity retention ratio (%) | Thickness increasing rate (%) |
|---|---|---|---|---|---|---|
| | | Metal element | Maximum concentration position X | Maximum concentration (atomic %) | | |
| Example 9-1 | 0.1 | Fe | 5 | 25 | 86.2 | 14.6 |
| Example 9-2 | 0.2 | | | | 89.6 | 13.2 |
| Example 9-3 | 0.3 | | | | 90.1 | 13.2 |
| Example 9-4 | 0.4 | | | | 90.3 | 13.1 |

As shown in Table 9, there was a tendency that as the surface roughness Ra of the anode current collector 33A was increased, the capacity retention ratio was improved, and the thickness increasing rate became small. That is, it was found that the surface roughness Ra of the anode current collector 33A was preferably 0.1 μm or more, and more preferably 0.2 μm or more.

Examples 10-1 to 10-14

Secondary batteries having the structure shown in FIG. 1 were fabricated by using the battery can 11 made of aluminum or nickel-plated iron. The anode 21 and the cathode 22 were formed in the same manner as in Examples 2-5, 2-11, 2-17, 2-23, 2-29, 2-35, and 2-41. For the electrolytic solution, a solution obtained by dissolving 1 mol/l of $LiPF_6$ in a mixed solvent of 4-fluoro-1,3-dioxolane-2-one and diethyl carbonate at the weight ratio of 1:1 was used.

For the fabricated secondary batteries of Examples 10-1 to 10-14, charge and discharge were performed as in Examples 2-5, 2-11, 2-17, 2-23, 2-29, 2-35, and 2-41, and the capacity retention ratio and the thickness increasing rate were examined. The obtained results are shown in Table 10 together with the results of Examples 2-5, 2-11, 2-17, 2-23, 2-29, 2-35, and 2-41.

As shown in Table 10, in the example using the battery can 11 made of aluminum, and particularly in the example using the battery can 11 made or iron, the capacity retention ratio could be improved and the thickness increasing rate could be smaller, compared to the examples using the package member 40 made of the aluminum laminated film. That is, it was found that the battery can 11 was preferably used for the package, and the iron can was more preferably used for the package.

The invention has been described with reference to the embodiments and the examples. However, the invention is not limited to the foregoing embodiments and the foregoing examples, and various modifications may be made. For example, in the foregoing embodiments and the foregoing examples, descriptions have been given of the case using the electrolytic solution as a liquid electrolyte or the so-called gelatinous electrolyte. However, other electrolyte may be used. As other electrolyte, a solid electrolyte having ion conductivity, a mixture of a solid electrolyte and an electrolytic solution, or a mixture of a solid electrolyte and a gelatinous electrolyte can be cited.

As a solid electrolyte, for example, a polymer solid electrolyte in which an electrolyte salt is dispersed in a polymer having ion conductivity, or an inorganic solid electrolyte formed of ion conductive glass, ionic crystal or the like can be used. As a polymer of the polymer solid electrolyte, for

TABLE 10

| | Package | Metal element increasing and decreasing region | | | Capacity retention ratio (%) | Thickness increasing rate (%) |
|---|---|---|---|---|---|---|
| | | Metal element | Maximum concentration position X | Maximum concentration (atomic %) | | |
| Example 2-5 | Laminated film | Co | 5 | 25 | 90.2 | 11.2 |
| Example 2-11 | | Ni | | | 89.7 | 12.5 |
| Example 2-17 | | Ti | | | 91 | 13.5 |
| Example 2-23 | | Zr | | | 90.2 | 12.9 |
| Example 2-29 | | Al | | | 87.2 | 13.1 |
| Example 2-35 | | Cr | | | 88.6 | 13.4 |
| Example 2-41 | | Fe + Co | | | 92.6 | 5.3 |
| Example 10-1 | Al can | Co | 5 | 25 | 91.3 | 8.2 |
| Example 10-2 | | Ni | | | 90.3 | 7.8 |
| Example 10-3 | | Ti | | | 92.1 | 7.6 |
| Example 10-4 | | Zr | | | 91.3 | 7.2 |
| Example 10-5 | | Al | | | 89.3 | 7.3 |
| Example 10-6 | | Cr | | | 89.9 | 7.5 |
| Example 10-7 | | Fe + Co | | | 94.1 | 2.9 |
| Example 10-8 | Fe can | Co | 5 | 25 | 92.6 | 4.5 |
| Example 10-9 | | Ni | | | 92.1 | 4.3 |
| Example 10-10 | | Ti | | | 93.5 | 4.1 |
| Example 10-11 | | Zr | | | 92.6 | 3.9 |
| Example 10-12 | | Al | | | 91.1 | 4.1 |
| Example 10-13 | | Cr | | | 92.1 | 4 |
| Example 10-14 | | Fe + Co | | | 97.3 | 1.5 | example, an ether polymer such as polyethylene oxide and a cross-linked body containing polyethylene oxide, an ester polymer such as poly methacrylate, or an acrylate polymer can be used singly, by mixing, or by copolymerization. As an inorganic solid electrolyte, a substance containing lithium nitride, lithium phosphate or the like can be used.

Further, in the foregoing embodiments and the foregoing examples, descriptions have been given of the battery element spirally wound in the oval shape or the flat shape. However, the battery element may be spirally wound in the circle shape, may be in a folded state, or may be in a laminated state. Further, while the description has been given of the case using the battery can in the shape of an approximately hollow cylinder, a battery can having other shape such as a cylinder, a coin, and a button may be used. In addition, the invention can be applied to primary batteries in addition to the secondary batteries.

It should be understood by those skilled in the art that various modifications, combinations, sub-combinations and alternations may occur depending on design requirements and other factors insofar as they are within the scope of the appended claims or the equivalents thereof.

What is claimed is:

1. An anode comprising:
an anode current collector; and
an anode active material layer containing silicon (Si) as an element, wherein the anode active material layer has a metal element increasing and decreasing region in which a metal element is contained as an element, and a concentration of the metal element is increased and then decreased in a thickness direction,
wherein,
the anode active material layer further contains oxygen (O) as an element.

2. The anode according to claim 1, wherein the anode active material layer further includes a metal element constant region in which the metal element is contained, and a concentration of the metal element therein is lower than the concentration of the metal element in the metal element increasing and decreasing region and constant in the thickness direction, and
the metal element increasing and decreasing region and the metal element constant region exist in the form of layer in the thickness direction of the anode active material layer.

3. The anode according to claim 1, wherein the anode active material layer has a plurality of the metal element increasing and decreasing regions in the form of layer in the thickness direction.

4. The anode according to claim 1 containing at least one selected from the group consisting of titanium (Ti), chromium (Cr), iron (Fe), cobalt (Co), nickel (Ni), and zirconium (Zr) as the metal element.

5. The anode according to claim 1, wherein the anode active material layer has a high oxygen region with a high oxygen concentration and a low oxygen region with a low oxygen concentration in the form of layer in the thickness direction.

6. The anode according to claim 5, wherein the high oxygen region and the metal element increasing and decreasing region correspond with each other at least in part.

7. The anode according to claim 1, wherein some of the metal element is bonded to oxygen to form an oxide.

8. The anode according to claim 1, wherein at least part of the anode active material layer is formed by vapor-phase deposition method.

9. The anode according to claim 1, wherein the anode active material layer is alloyed with the anode current collector at least in part.

10. The anode according to claim 1, wherein a surface roughness of the anode current collector is 0.1 µm or more in unit of value Ra.

11. The anode according to claim 1, wherein the active material layer has a plurality of active material particles containing the silicon,
the active material particles form a plurality of secondary particles, and
each secondary particle is separated by a groove.

12. A battery comprising:
a cathode;
an anode; and
an electrolyte,
wherein,
the anode includes an anode current collector and an anode active material layer containing silicon (Si) as an element,
the anode active material layer includes a metal element increasing and decreasing region in which a metal element is contained as an element,
a concentration of the metal element increases and then decreases in a thickness direction, and
the anode active material layer further contains oxygen (O) as an element.

13. The battery according to claim 12, wherein the anode active material layer further includes a metal element constant region in which the metal element is contained, and a concentration of the metal element therein is lower than the concentration of the metal element in the metal element increasing and decreasing region and constant in the thickness direction, and
the metal element increasing and decreasing region and the metal element constant region exist in the form of layer in the thickness direction of the anode active material layer.

14. The battery according to claim 12, wherein the anode active material layer has a plurality of the metal element increasing and decreasing regions in the form of layer in the thickness direction.

15. The battery according to claim 12, wherein at least one selected from the group consisting of titanium (Ti), chromium (Cr), iron (Fe), cobalt (Co), nickel (Ni), and zirconium (Zr) is contained as the metal element.

16. The battery according to claim 12, wherein the anode active material layer has a high oxygen region with a high oxygen concentration and a low oxygen region with a low oxygen concentration in the form of layer in the thickness direction.

17. The battery according to claim 16, wherein the high oxygen region and the metal element increasing and decreasing region correspond with each other at least in part.

18. The battery according to claim 12, wherein some of the metal element is bonded to oxygen to form an oxide.

19. The battery according to claim 12, wherein at least part of the anode active material layer is formed by vapor-phase deposition method.

20. The battery according to claim 12, wherein the anode active material layer is alloyed with the anode current collector at least in part.

21. The battery according to claim 12, wherein a surface roughness of the anode current collector is 0.1 µm or more in unit of value Ra.

22. The battery according to claim 12, wherein the cathode, the anode, and the electrolyte are contained inside a battery can.

23. The battery according to claim 12, wherein the active material layer has a plurality of active material particles containing silicon, the active material particles form a plurality of secondary particles, and
each secondary particle is separated by a groove.

* * * * *